(12) United States Patent
Shibata et al.

(10) Patent No.: US 9,889,493 B2
(45) Date of Patent: Feb. 13, 2018

(54) WHEEL BEARING DEVICE WITH A CLEARANCE FORMED BETWEEN THE INNER RACE AND THE HUB WHEEL

(75) Inventors: Kiyotake Shibata, Iwata (JP); Hirai Isao, Iwata (JP); Kobayashi Keizo, Iwata (JP); Eiji Hora, Nishimuro-gun (JP)

(73) Assignee: NTN CORPORATION, Osaka (JP)

( * ) Notice: Subject to any disclaimer, the term of this patent is extended or adjusted under 35 U.S.C. 154(b) by 1067 days.

(21) Appl. No.: 12/867,768

(22) PCT Filed: Mar. 9, 2009

(86) PCT No.: PCT/JP2009/054390
§ 371 (c)(1),
(2), (4) Date: Aug. 16, 2010

(87) PCT Pub. No.: WO2009/113476
PCT Pub. Date: Sep. 17, 2009

(65) Prior Publication Data
US 2010/0316323 A1 Dec. 16, 2010

(30) Foreign Application Priority Data

Mar. 13, 2008 (JP) ................................. 2008-064470
Mar. 21, 2008 (JP) ................................. 2008-073630
Apr. 3, 2008 (JP) ................................. 2008-097083

(51) Int. Cl.
*B21H 1/12* (2006.01)
*F16C 33/64* (2006.01)
(Continued)

(52) U.S. Cl.
CPC ............. *B21H 1/12* (2013.01); *F16C 19/184* (2013.01); *F16C 33/588* (2013.01); *F16C 33/64* (2013.01);
(Continued)

(58) Field of Classification Search
CPC ............ B60B 27/0094; B60B 27/0089; B60B 27/0005; B60B 35/18; F16C 35/063;
(Continued)

(56) References Cited

U.S. PATENT DOCUMENTS 4,969,753 A * 11/1990 Kato et al. .................... 384/506
5,193,916 A * 3/1993 Andersson .................... 384/512
(Continued)

FOREIGN PATENT DOCUMENTS

JP 62-63419 4/1987
JP 5-66215 12/1989
(Continued)

OTHER PUBLICATIONS

JP,2007-210356,A. Japan Patent Office. Jun. 12, 2013. http://dossier1.ipdl.inpit.go.jp/AIPN/odse_call_transl.ipdl?N0000=7413&N0005=Ei7BzenZVnBvfz7D1ZIK&N0120=01&N2001=2&N3001=2007-210356&Ntt3=autoV14&Ntt4=machineV14&Ntt5=logisticsV14&Ntt6=&Ntt7=&Ntt8=&Ntt9=&Ntt10=&Ntt11=&Ntt12=.*
(Continued)

*Primary Examiner* — Daniel D Yabut
(74) *Attorney, Agent, or Firm* — Wenderoth, Lind & Ponack, L.L.P.

(57) ABSTRACT

A wheel bearing device includes a hub wheel and a wheel bearing press-fitted onto the hub wheel. A clearance is formed between at least one inner race and the hub wheel such that the at least one inner race is out of contact with the hub wheel at a position where an action line intersects with the hub wheel, the action line being a contact angle of the balls on the outboard side with the at least one inner race. A large-diameter side radially inner surface of the at least one inner race is formed as a curved surface opposed to the inner rolling surface of the at least one inner race. An axial
(Continued)

dimension La of a corner portion of the hub wheel is 1.5 times or more as large as a radial dimension Lr thereof.

4 Claims, 25 Drawing Sheets

(51) Int. Cl.
*F16C 35/063* (2006.01)
*F16C 19/18* (2006.01)
*F16C 33/58* (2006.01)

(52) U.S. Cl.
CPC ........ *F16C 35/063* (2013.01); *F16C 2240/70* (2013.01); *F16C 2326/02* (2013.01); *Y10T 29/49643* (2015.01)

(58) Field of Classification Search
CPC ...... F16C 19/043; F16C 19/184; F16C 19/18; F16C 19/38; F16C 33/588; F16C 33/64; B21H 1/12
USPC ....... 384/589, 544, 537, 543, 569, 584–586, 384/504–506, 513–515; 29/898.04, 29/898.066
See application file for complete search history.

(56) References Cited

U.S. PATENT DOCUMENTS

| | | | |
|---|---|---|---|
| 5,215,387 A * | 6/1993 | Bertetti et al. | 384/544 |
| 5,499,832 A * | 3/1996 | Iwamoto et al. | 384/544 |
| 5,894,752 A | 4/1999 | Yano et al. | |
| 5,951,173 A * | 9/1999 | Matsui et al. | 384/513 |
| 5,988,324 A * | 11/1999 | Bertetti et al. | 384/585 |
| 7,147,381 B2 * | 12/2006 | Ohtsuki | 384/537 |
| 7,604,416 B2 * | 10/2009 | Niebling et al. | 384/544 |
| 7,614,795 B2 * | 11/2009 | Adachi et al. | 384/544 |
| 7,618,196 B2 * | 11/2009 | Hirai et al. | 384/544 |
| 7,635,226 B2 * | 12/2009 | Norimatsu et al. | 384/544 |
| 8,186,888 B2 * | 5/2012 | Ohtsuki | 384/544 |
| 2007/0119054 A1 * | 5/2007 | Kobayashi et al. | 29/898.066 |
| 2007/0160317 A1 * | 7/2007 | Niebling | B60B 27/00 384/544 |
| 2009/0116779 A1 * | 5/2009 | Komori et al. | 384/544 |

FOREIGN PATENT DOCUMENTS

| | | |
|---|---|---|
| JP | 02-294453 | 12/1990 |
| JP | 03-090239 | 4/1991 |
| JP | 07-054852 | 2/1995 |
| JP | 2539751 | 2/1995 |
| JP | 10-85890 | 4/1998 |
| JP | 10-212528 | 8/1998 |
| JP | 2003-049226 | 2/2003 |
| JP | 2004-245260 | 9/2004 |
| JP | 2006-181638 | 7/2006 |
| JP | 2007-016865 | 1/2007 |
| JP | 2007-016959 | 1/2007 |
| JP | 2007-120771 | 5/2007 |
| JP | 2007210356 A * | 8/2007 |
| JP | 2007-292116 | 11/2007 |
| JP | 2008002607 A * | 1/2008 |

OTHER PUBLICATIONS

JP,2008-002607,A. Japan Patent Office: AIPN. http://dossier1.ipdl.inpit.go.jp/AIPN/odse_call_transl.ipdl?N0000=7413&NO005=Ei7BzenZVnBvfz7D1ZIK&N0120=01&N2001=2&N3001=2008-002607&Ntt3=autoV14&Ntt4=logisticsV14&Ntt5=machineV14&Ntt6=&Ntt7=&Ntt8=&Ntt9=&Ntt10=&Ntt11=&Ntt12=.*
International Preliminary Report on Patentability and Written Opinion of the International Searching Authority dated Nov. 11, 2010 in International (PCT) Application No. PCT/JP2009/054390.
Japanese Office Action dated Dec. 27, 2012 in corresponding Japanese Patent Application No. 2008-064470 with partial translation.
International Search Report dated Jun. 2, 2009 in International (PCT) Application No. PCT/JP2009/054390.

* cited by examiner

WHEEL BEARING DEVICE WITH A CLEARANCE FORMED BETWEEN THE INNER RACE AND THE HUB WHEEL

CROSS REFERENCE TO RELATED APPLICATION

This application is a U.S. national phase application under 35 U.S.C. § 371 of International Application No. PCT/JP2009/054390 filed Mar. 9, 2009, which claims priority to JP 2008-064470 filed Mar. 13, 2008, JP 2008-073630 filed Mar. 21, 2008, and JP 2008-097083 filed Apr. 3, 2008 all of which are herein incorporated by reference in their entirety.

TECHNICAL FIELD

The present invention relates to a wheel bearing device for rotatably supporting a wheel with respect to a vehicle body of a vehicle such as an automobile, a double-row angular bearing capable of being used as a bearing of the wheel bearing device, and a method of manufacturing an outer race of a double-row angular bearing.

BACKGROUND ART

The wheel bearing devices having the following structures have been developed: a structure called first-generation structure in which double-row roller bearings are independently used; a second-generation structure in which a vehicle-body attachment flange is integrally provided to an outer member, the second-generation structure having evolved from the first-generation structure; further, a third-generation structure in which an inner rolling surface of one of the double-row roller bearings is formed integrally with an outer periphery of a hub wheel integrally having a wheel attachment flange; and still further, a fourth-generation structure in which a constant velocity universal joint is integrated with the hub wheel and an inner rolling surface of another of the double-row roller bearings is also formed integrally with an outer periphery of an outer joint member constituting the constant velocity universal joint.

It is necessary to press-fit the wheel bearing device having the first-generation structure into a knuckle on a vehicle body side, and hence the number of man-hours is required for assembly and replacement. However, the wheel bearing device having the first-generation structure can be manufactured at lower cost than the wheel bearing devices having the second-generation and third-generation structures, and hence the wheel bearing device having the first-generation structure is mainly used for light automobiles and small automobiles in many cases.

As illustrated in FIG. 21, the wheel bearing device having the structure called first generation (for example, Patent Literature 1) includes the following: a hub wheel 102 having a flange 101 extending in a radially outer direction; a constant velocity universal joint 104 having an outer joint member 103 engaged with the hub wheel 102; and a bearing 100 arranged on an outer peripheral side of the hub wheel 102.

The constant velocity universal joint 104 includes the outer joint member 103, an inner joint member (not shown) arranged in the outer joint member 103, balls (not shown) arranged between the inner joint member and the outer joint member 103, and a cage (not shown) which retains the balls. The outer joint member 103 is constituted by a cup-shaped mouth section 107 in which the inner joint member is housed, and a stem shaft 123 projected from the mouth section 107.

Further, the hub wheel 102 includes a barrel section 113 and the flange 101. A larger-diameter first portion 115a and a smaller-diameter second portion 115b are formed on an outer end surface 114 (end surface on a side opposite to the joint) of the flange 101. A brake rotor 140 is externally fitted onto the first portion 115a, and a wheel (not shown) is externally fitted onto the second portion 115b.

As illustrated in FIG. 22, the bearing 100 includes the following: an outer race 105 having double-row outer rolling surfaces 120 and 121 formed on an inner periphery thereof; a pair of inner races 108 and 109 having inner rolling surfaces 118 and 119 formed on outer peripheries thereof, the inner rolling surfaces 118 and 119 being opposed to the outer rolling surfaces; and double-row rolling elements 122 rollably housed between the outer rolling surfaces 120 and 121 of the outer race 105 and the inner rolling surfaces 118 and 119 of the inner races 108 and 109. Then, as illustrated in FIG. 21, a cutout portion 116 is provided on an outer peripheral surface of the barrel section 113 of the hub wheel 102, and the inner races 108 and 109 are fitted to the cutout portion 116. Further, a bolt insertion hole 112 is provided in the flange 101 of the hub wheel 102. A hub bolt 141 for fixing the wheel and the brake rotor 140 to the flange 101 is inserted into the bolt insertion hole 112.

A stem shaft 123 of the outer joint member 103 is inserted into the barrel section 113 of the hub wheel 102. In the stem shaft 123, a screw portion 124 is formed in an end portion thereof on a side opposite to the mouth section. A spline portion 125 is formed between the screw section 124 and the mouth section 107. Further, another spline portion 126 is formed on an inner peripheral surface (radially inner surface) of the barrel section 113 of the hub wheel 102. When the stem shaft 123 is inserted into the barrel section 113 of the hub wheel 102, the spline portion 125 on the stem shaft 123 side and the spline portion 126 on the hub wheel 102 side are engaged with each other.

A nut member 127 is screwed into the screw section 124 of the stem shaft 123 protruding from the barrel section 113, and the hub wheel 102 and the outer joint member 103 are coupled to each other. In this case, an inner end surface (back surface) 128 of the nut member 127 and an outer end surface 129 of the barrel section 113 are brought into contact with each other, and a back surface 130 of the mouth section 107 and an end surface 131 of the inner race 109 are brought into contact with each other. That is, when the nut member 127 is tightened, the hub wheel 102 is sandwiched by the nut member 127 and the mouth section 107 through intermediation of the inner races 108 and 109. In this case, under the state in which a cutout end surface 132 of the hub wheel 102 and an end surface 133 of the inner race 108 are brought into contact with each other, and in which the back surface 130 of the mouth section 107 and the end surface 131 of the inner race 109 are brought into contact with each other, hitting surfaces 135 and 136 of the inner races 108 and 109 are hit against each other. In this case, a radially outer surface of the outer race 105 serves as a fitting surface 105a, and is press-fitted into a radially inner surface 145a of a knuckle 145 on a vehicle body side.

Generally, the inner races 108 and 109, the outer race 105, and the rolling elements (steel balls) 122 are formed of high-carbon chrome bearing steel such as SUJ2 or a material equivalent thereto. Further, those members are hardened by immersion quenching or the like so as to have the hardness of from 58 to 64 HRC as a whole. Note that, HRC represents Rockwell Hardness C-Scale.

Incidentally, the outer race 105 is formed by trimming a raw material as a short cylindrical body. However, as a shape of the outer race 105, it is necessary to form rolling surfaces, seal fitting portions (seal mounting surfaces), and the like in a radially inner surface thereof, which leads to increases in weight of the material to be removed (material loss, which is equal to a difference of a weight of the product from a weight of the charged material) and in material cost corresponding thereto.

Under the circumstances, in recent years, there have been proposed outer races formed by a rolling process which enable material cost reduction. In this case, first, a blank is formed by hot forging or the like. The blank has a rough shape and a diameter smaller than that of a completed outer race. Next, the diameter of the blank is increased by cold rolling, hot rolling, or the like. After that, the blank is processed by a latching process into a product shape in which a grinding margin is left. Then, thermal hardening treatment is performed to the core of the blank, and grinding is performed thereon. Blanks are completed in this manner.

Regarding the cases of forming blanks, there have been a case where only an outer race is subjected to hot forging, and a case of so-called "two-stage removal" in which an outer race and one inner race are simultaneously forged and separated from each other at a last step of the forging steps (Patent Literature 2). Further, examples of the methods of forming blanks by cold rolling include various ones (Patent Literatures 3, 4, 5, and 6, for example).

Generally, cold rolling processes are performed with a cold rolling machine as illustrated in FIG. 24. The cold rolling machine includes a mandrel 150 for a radially inner surface and a forming roll 151 for a radially outer surface. On an outer peripheral surface of the mandrel 150, there is an outer-race-radially-inner-surface forming section 152 which forms the radially inner surface of the outer race 105. On a radially outer surface of the forming roll 151, there is formed an outer-race-radially-outer-surface forming section 153 which forms the radially outer surface of the outer race 105.

The outer-race-radially-inner-surface forming section 152 includes rolling-surface forming portions 152a and 152a and seal-fitting-portion forming portions 152b and 152b. Further, the outer-race-radially-outer-surface forming section 153 includes an annular-recessed-portion forming portion 153a and fitting surface forming portions 153b and 153b.

In this case, a blank 160 is constituted by a short cylindrical body having basically straight inner and outer diameters as illustrated in FIG. 23. As illustrated in FIG. 24, under a state in which the blank 160 is externally fitted to the mandrel 150 and in which the blank 160 is sandwiched by the mandrel 150 and the forming roll 153, the forming roll 153 is rotated about an axial center thereof. In this manner, the outer race 105 having a shape as illustrated in FIG. 25 can be formed.

Note that, in the outer race 105 illustrated in FIG. 25, an annular recessed portion 155 is provided at an axial center portion of a radially outer surface (knuckle press-fitting surface) 105a. Due to formation of the annular recessed portion 155, a protruding portion 156 swelling to a radially inner side is provided on a radially inner surface 105b of the outer race 105. Then, rolling surfaces 120 and 121 are formed on both sides of the protruding portion 156.

Further, in order to achieve weight reduction and cost reduction, there have been proposed bearings (double-row angular bearings) in which inner and outer races are formed by a pressing process (Patent Literature 7).

That is, as illustrated in FIG. 26, the double-row angular bearing disclosed in Patent Literature 7 includes the following: an outer race 173 formed of a pressed steel plate and having double-row raceways 171 and 172; a plurality of inner races 176 and 177 having raceways 174 and 175 corresponding to the double-row raceways 171 and 172 of the outer race 173, respectively; and double-row rolling elements 178 arranged between the double-row raceways 171 and 172 of the outer race 173 and the raceways 174 and 175 of the inner races 176 and 177. The outer race 173 of this roller bearing is internally fitted to a housing 180 and fixed thereto.

Further, a recessed portion 161 is formed at a part corresponding to a gap between the double-row raceways 171 and 172 on an outer peripheral surface of the outer race 173. An elastic body 162 for elastically urging the outer race 173 and the housing 180 is interposed between the recessed portion 161 and the housing 180. The inner races 176 and 177 are externally fitted to a shaft (not shown) through intermediation of an annular spacer 163. Note that, the annular spacer 163 is provided for preventing the inner races 176 and 177 from being disarranged in an axial direction.

Patent Literature 1: JP 2007-120771 A
Patent Literature 2: JP Hei 05-66215 B
Patent Literature 3: Japanese Utility Model Application Laid-open No. Sho 62-63419
Patent Literature 4: JP Hei 03-90239 A
Patent Literature 5: JP 2539751 B
Patent Literature 6: JP 2006-181638 A
Patent Literature 7: JP 2004-245260 A

SUMMARY OF INVENTION

Technical Problems

However, the cold rolling as illustrated in FIG. 24 involves a much amount of plastic deformation, and may involve a risk that microcracks occur in the following: parts at which double-row rolling surfaces and a shoulder portion therebetween are continuous with each other, the shoulder portion including the parts; and portions on seal-fitting-portion sides of counterbore portions each of which is provided between a rolling surface and a seal fitting portion of an end portion.

Incidentally, in order to secure hardness required for bearings, outer-race blanks are subjected to a cold rolling process (hereinafter, abbreviated as CRF, CRF: COLD ROLLING FORMING) and width-direction latching, and then subjected to quenching/tempering. Thus, when an outer race having microcracks is subjected to thermal treatment, the cracks are developed in some cases, which leads to a risk that the cracks are developed beyond the depth prior to thermal treatment, with the result of being unable to be removed even by a polishing step after thermal treatment. Further, there is another risk that the outer race itself breaks owing to development of the cracks.

When a bearing inclines by moment load from a tire by the centrifugal force during turning of a vehicle, rolling elements roll near the shoulder portion between rows, that is, the shoulder portion between the rolling surfaces. In particular, large moment load is applied to a bearing on a turning outer side, and accordingly a surface pressure applied to the rolling surfaces becomes high when the rolling elements roll near the shoulder portion between the rolling surfaces. When a turning acceleration in a lateral direction becomes high owing to quick turning and the like, a contact ellipse of the rolling elements and the rolling surfaces do not remain within the rolling surfaces and extend out therefrom (climbing onto the shoulder portion). Thus, a surface pressure applied to the end potions near the shoulder between the rolling surfaces becomes much higher. When microcracks having failed to be removed by a polishing step are left in the portions to which the high surface pressure is applied, the rolling elements run on, during turning of the vehicle, the microcracks, which causes the rolling surfaces to be damaged earlier. As a result, a life of the bearing becomes short.

Even in a case where cracks are not formed, when a corner portion (shoulder portions and the like) is insufficient in thickness in the case of milling race grooves near the shoulder portion between a mandrel and a roller at the time of CRF, the shape of the shoulder portion varies and the rolling elements become liable to climb onto the shoulder portion in some cases. In such a case, variation in life is increased, and accordingly bearings of short lives may be manufactured. Thus, when an attempt is made to remove the microcracks and the thickness-insufficient portions by latching, a cut margin is left in a shape after CRF, which leads to waste of materials. Accordingly, a material cost is increased, and efficiency is lowered owing to an increase in the number of steps. As a result, a processing cost is also increased.

Further, in order to fill the space between the roll and the mandrel, an end portion of the blank is formed in a shape of involving small burrs. Accordingly, the space between the roll and the mandrel is configured to be slightly longer in an axial direction than the blank. Therefore, a behavior of the blank is unstable when the blank is biased at an early stage of the milling, and the blank rapidly moves from the spot of being biased to a spot of easily conforming to the roll and the mandrel at the early stage of the milling. In addition, the shapes of the mandrel and the roll are not accurately transferred in some cases. In those cases, rolling elements are liable to climb onto the shoulder portion in a bearing as a product, which leads to the shortened bearing life.

In the bearing illustrated in FIG. 26, the recessed portion 161 is formed at an axial center portion of the radially outer surface of the outer race 173, and the elastic body 162 is fitted to the recessed portion 161. This is because deformation of the radially outer surface of the outer race 173 is prevented with the configuration, whereby radial bearing gap clogging is prevented from occurring, the radial bearing gap clogging being caused by insufficiency in rigidity of the outer race itself. Further, a gap is formed between the pair of inner races 176 and 177, and surfaces thereof opposite to each other are not hit against each other. This is because the inner races 176 and 177 cannot be formed with high accuracy.

Thus, the conventional bearings as illustrated in FIG. 26 require a large number of components and are poor in assembly property, to thereby involve high cost. In addition, the conventional bearings are poor in accuracy, and hence inner gaps thereof vary from each other. The inner gaps during operation of the bearing is an important factor, the sizes of which have an influence on performance, such as sound, vibration, heat generation, and a fatigue life. When the inner gaps varies from each other, bearings are not stable as products, and a bearing life is shortened.

Incidentally, in general wheel bearing devices, a corner portion of a smaller-diameter step portion (smaller-diameter portion onto which the inner race of the bearing is fitted) of the hub wheel is constituted by an arcuate surface (single R) having a single curvature radius. In this context, in the wheel bearing devices having been thinned in cross-section for achieving weight reduction, it is necessary to increase a hitting-portion length of the hub wheel with respect to a larger-end surface of the inner race (contact area) within a restricted space in order to secure rigidity of the inner race. However, when the length of the hitting portion is increased, the corner portion becomes excessively small. In particular, when large moment load is repeatedly applied to the hub wheel through intermediation of a wheel attachment flange during turning of a vehicle, excessive stress is generated in the corner portion, which may lead to a risk that mechanical strength of the hub wheel is remarkably reduced and durability thereof is reduced in accordance therewith.

In this context, when the curvature radius of the single R is increased so that the stress generated in the corner portion is reduced, the corner portion interferes with a chamfered portion of the inner race. The interference between the corner portion and the inner race induces misalignment, which may lead to a risk that durability of the inner race is reduced. Thus, it is necessary to minimize dimensional variation in a processing of the corner portion, which leads to a sharp increase in manufacturing cost. In addition, as a result of consideration of variation owing to deformation due to thermal treatment, a limitation on restriction of dimensional variation has been found.

As a solution to the problems as described above, the applicants of the present invention have proposed a wheel bearing device as illustrated in FIG. 27. In the wheel bearing device, a corner portion A between a shoulder portion 182 of a hub wheel 181 and a smaller-diameter step portion 183 is constituted by a composite R having a plurality of curvature radii b and c. In addition, the curvature radius b is set to be smaller than a maximum curvature radius a when the corner portion A is a single R, and the curvature radius c is set to be larger than the curvature radius a (b<a<c). With this setting, it is possible to enhance the rigidity of an inner race 184 by securing a hitting-portion length X of the hub wheel 181 with respect to a larger-end surface 185 of the inner race 184 within a restricted space, and to provide a wheel bearing device in which stress generated in the corner portion A is suppressed and durability of the hub wheel 181 is enhanced. Further, in a processing of the corner portion A, it is possible to prevent interference with respect to a chamfered portion 186 of the inner race 184 without suppressing dimensional variation more than necessary, to thereby achieve cost reduction (Patent Literature: JP 2007-210356 A).

However, while the wheel bearing devices have been promoted to be thinned in cross-section for achieving weight reduction, when dimensions themselves of the curvature radius c and the smaller-diameter step portion 183 and the curvature radius b and the shoulder portion 182 are small in the corner portion A of the hub wheel 181, there have been a limitation on remarkable enhancement of durability even with a change that the corner portion A of the hub wheel 181 is constituted by the composite R described above.

Under the circumstances, it is a first object of the present invention to provide the following: a method of manufacturing an outer race which contributes to extension of the bearing life and allows rolling elements to stably roll; an outer race for a double-row angular bearing; and a wheel bearing device. It is a second object of the present invention to provide a double-row angular bearing which is excellent in both strength and rigidity and which can be endowed with a longer life and higher quality. It is a third object of the present invention to provide a lighter-weight and compactified wheel bearing device which has a hub wheel of higher strength and durability.

Solution to Problems

An outer-race manufacturing method of manufacturing an outer race of a double-row angular bearing used in a wheel bearing device according to the present invention includes forming an outer race by performing a cold rolling process on a blank including a circumferentially protruding portion which is provided on a radially inner surface of the blank and protrudes to a radially inner side of the blank. Incidentally, the cold rolling process (cold rolling) is a processing method of milling a blank (formation raw material) while rotating the raw material kept in a cold state (at normal temperature) without applying heat thereto. Specifically, the cold rolling process is a processing method of forming a work (finished product after processing) in the following manner: the blank having inner and outer diameters smaller than those of the work is sandwiched between two jigs (for radially inner and outer surfaces) designed for achieving a shape into which the blank is desired to be processed; and the blank is then milled while being rotated.

The outer race of the double-row angular bearing used for the wheel bearing device has a shape of being provided with rolling surfaces, seal fitting portions, and the like which are formed on the radially inner surface thereof. Thus, protruding and recessed portions are formed on the radially inner surface of the outer race. With this configuration, as in the method of manufacturing an outer race according to the present invention, with use of the blank including a circumferentially protruding portion which is provided on a radially inner surface of the blank and protrudes to a radially inner side of the blank, a corner portion of a shoulder portion or the like is prevented from insufficient in thickness, and the rolling surfaces, the seal fitting portions, and the like can be formed. That is, when cold rolling is performed on the blank including the protruding portions formed on the radially inner surface thereof, it is possible to suffice the thickness of the spots at which microcracks are liable to occur. Therefore, it is possible to omit the following work: "in order to remove microcracks and thickness-insufficient parts, subjecting the blank to CRF into a shape of having large thickness and being provided with a cut margin, and removing the cut margin after CRF."

It is preferred that the blank include a circumferentially protruding portion constituting a shoulder portion between double-row rolling surfaces, the circumferentially protruding portion being provided on the radially inner surface of the blank. It is preferred that the blank include circumferentially protruding portions constituting counterbores, the circumferentially protruding portions being provided on the radially inner surface of the blank.

Unlike a trimming process of trimming off extra portions of a raw material, the cold rolling enables a product to be formed by bulging a blank thinner in an outer diameter than the product, to thereby eliminate waste of materials. Further, in cold rolling, due to a shorter processing time period, longer lives of tools, and the like, productivity is higher in comparison with that in the trimming process. Further, although it is necessary to exchange the tools (mandrel and forming roll) used in conformity with articles to be processed, stable processing accuracy can be realized. In addition, unlike the trimming process, the fiber flows (fibrous metal structure) remain uncut. Therefore, the processed product can be endowed with a longer life and higher strength.

In an outer race for a double-row angular bearing according to the present invention, manufactured by the above-mentioned method of manufacturing an outer race, surfaces except side end surfaces of the outer race are formed by a cold rolling process or a grinding process.

The surfaces except the side end surfaces maybe formed by the cold rolling process or the grinding process, and hence the outer race is excellent in processing properties. In addition, the material cost and the processing cost can be reduced.

It is preferred that the outer race be formed of high-carbon chrome bearing steel such as SUJ2 which is subjected to spheroidizing annealing so as to have hardness of from 80 to 94 HRB, the high-carbon chrome bearing steel being used as the blank. Alternatively, the outer race may be formed of carbon steel which includes 0.45 to 0.80 weight % of carbon and less than 1.0 weight % of chrome and is subjected to spheroidizing annealing so as to have hardness of from 80 to 88 HRB, the carbon steel being used as the blank. Note that, HRB represents Rockwell Hardness B-Scale.

Incidentally, spheroidizing annealing is thermal treatment of spheroidizing carbides in steel and uniformly dispersing the carbides thereinto. Therefore, through spheroidizing annealing, it is possible to facilitate plastic working and machining for the steel, or to improve mechanical properties thereof.

In an double-row angular bearing according to the present invention including an inner race and an outer race at least one of which is formed by a cold rolling process, hardness prior to the cold rolling process of a blank is set to Rockwell Hardness 30 HRC or less. Incidentally, cold rolling is a processing method of milling a raw material (blank) while rotating the raw material kept in a cold state (at normal temperature) without applying heat thereto.

In the double-row angular bearing of the present invention, at least one of the inner race and the outer race is formed by cold rolling. Thus, it is possible to, for example, enhance yield of materials for the inner race and the like formed by cold rolling. That is, unlike a trimming process of trimming off extra portions of a raw material, the cold rolling enables a product to be formed by bulging a raw material thinner in an outer diameter than the product, to thereby eliminate waste of materials. Further, in cold rolling, due to a shorter processing time period, longer lives of tools, and the like, productivity is higher in comparison with that in the trimming process. Further, although it is necessary to exchange the tools (mandrel and forming roll) used in conformity with articles to be processed, stable processing accuracy can be realized. In addition, unlike the trimming process, the fiber flows (fibrous metal structure) remain uncut, and processed surfaces are subjected to composition hardening by plastic deformation. Therefore, the processed product can be endowed with higher strength.

In the present invention, hardness of the blank is set to Rockwell Hardness 30 HRC or less prior to the cold rolling process thereon, and hence the blank is excellent in processing properties and can be formed with high accuracy. In particular, hardness of the blank is preferably set to 25 HRC or less.

The blank can be made of bearing steel or medium carbon steel, and spheroidizing annealing is preferably performed thereon. Spheroidizing annealing maybe performed several times. High carbon steel which includes carbon in amount of 0.77% or more may be used, and in this case, spheroidizing annealing is more preferably performed thereon.

It is preferred that a grinding process be performed at least on rolling surfaces thereof after cold rolling. By the grinding process, the rolling surfaces can be finished with high accuracy.

In a first wheel bearing device according to the present invention provided with a double-row angular bearing, the outer race is used in the double-row angular bearing.

A second wheel bearing device according to the present invention includes: a hub wheel including: a wheel attachment flange integrally provided at one end portion thereof, for attachment of a wheel; and a smaller-diameter step portion extending in an axial direction from the wheel attachment flange via a shoulder portion; a wheel bearing press-fitted onto the smaller-diameter step portion of the hub wheel with a predetermined tightening margin, the wheel bearing including: an outer race serving as an outer member including double-row arcuate outer rolling surfaces formed integrally on an inner periphery thereof; a pair of inner races opposed to the double-row outer rolling surfaces, each of the inner races including an arcuate inner rolling surface formed on an outer periphery thereof; double-row balls housed between both the rolling surfaces of the inner races and the outer member; and seals mounted into opening portions of an annular space formed between the outer member and the inner race, the pair of inner races having smaller-end surfaces which abut against each other under a hitting state, to thereby constitute a double-row angular bearing of a back-to-back type, in which: the pair of inner races include at least one inner race on an outboard side, which is provided with a shoulder portion extending in an axial direction from a larger-diameter side of the inner rolling surface of the at least one inner race; the at least one inner race has thickness set to be substantially uniform over an entire width; at least one inner race includes a center position of a curvature radius of an inner diameter section in a larger-end portion set to be substantially the same as a center position of a curvature radius of the balls; and the at least one inner race is out of contact with the hub wheel so that clearance is secured therebetween at a position at which an action line of the at least one inner race intersects with the hub wheel, the action line forming a contact angle.

According to the second wheel bearing device of the present invention, the thickness of the inner races can be set to be substantially uniform, and a degree of freedom of setting the shape and dimensions of the corner portion (corner portion on a wheel attachment flange side of the smaller-diameter step portion) of the hub wheel is increased.

Preferably, as long as the one inner race on the outboard side is formed by subjecting a pipe material to a cold rolling process, it is possible to enhance productivity and yield, to thereby achieve cost reduction.

Further, it is preferred that a corner portion between the shoulder portion and smaller-diameter step portion of the hub wheel be constituted by a composite R having a curvature radius Rb and a curvature radius Rc, the curvature radius Rb on a side of the shoulder portion be set to be smaller than a maximum curvature radius Ra when a corner R is a single R, where Rb<Ra, and the curvature radius Rc on a side of the smaller-diameter step portion be set to be larger than the maximum curvature radius Ra, where Rc>Ra.

Further, it is preferred that the corner portion between the shoulder portion and smaller-diameter step portion of the hub wheel be constituted by the composite R having the curvature radius Rb and the curvature radius Rc and a tangential line smoothly connecting the curvature radius Rb and the curvature radius Rc, a mortar-like recessed part extending in the axial direction be formed by a forging process in an end portion on an outboard side of the hub wheel, and the corner portion have thickness set to be substantially uniform. It is possible to increase minimum thickness thereof in comparison with that of the hub wheel in which a corner R is a single R, and hence possible to enhance strength and durability of the hub wheel.

Further, it is possible that the curvature radius Rc be set to be twice or more as large as the curvature radius Rb. In addition, it is possible that an axial dimension La of the corner portion of the hub wheel be set to be 1.5 times or more as large as a radial dimension Lr thereof.

Advantageous Effects of Invention

In the method of manufacturing an outer race of the present invention, the outer race is formed by cold rolling forming, and hence it is possible to enhance the yield and productivity of the product, to thereby achieve cost reduction. In addition, the outer race can be endowed with stable processing accuracy, a longer life, and high strength, whereby it is possible to enhance quality of the bearing. Further, it is also possible to achieve weight reduction of the outer race, to thereby achieve fuel consumption reduction.

Further, it is possible to suffice the thickness of the spots at which microcracks are liable to occur. Thus, high-quality products are formed. That is, as long as the blank includes the circumferentially protruding portion which is provided on the radially inner surface thereof and constitutes the shoulder portion between the double-row rolling surfaces, the thickness sufficiency of the outer-race shoulder portion (rolling-surface shoulder portion) becomes good, whereby microcracks do not occur. In this manner, even when the bearing inclines by moment load from a tire during turning of the vehicle and when the rolling elements pass near the shoulder portion, microcracks do not occur, and hence a rolling life of the bearing is not adversely affected thereby. The thickness of the shoulder portion is not insufficient and the shape of the shoulder portion does not vary, and hence no individual differences occur as to whether or not the rolling elements climb onto the shoulder portion.

When the circumferentially protruding portions which constitute the counterbores are provided on the radially inner surface of the blank, the steps of the circumferentially protruding portions bite into recessed portions of the mandrel when milling (rolling) is started. As a result, the blank can be positioned in a center in a width direction of a space between the roll and the mandrel, and a behavior of the raw material at an early stage of the milling is stabilized. In this manner, the milling is performed uniformly right and left, and thickness sufficiency also becomes uniform right and left.

In addition, it is possible to omit the following work: "in order to remove microcracks and thickness-insufficient parts, subjecting the blank to CRF into a shape of having large thickness and being provided with a cut margin, and removing the cut margin after CRF," to thereby enhance the productivity and achieve cost reduction.

The surfaces except the side end surfaces maybe formed by the cold rolling process or the grinding process, and hence the outer roll is excellent in processing properties. In addition, the material cost and the processing cost can be reduced.

Through spheroidizing annealing, it is possible to facilitate plastic working and machining for the steel, or to improve mechanical properties thereof. Thus, the wheel bearing device can be further improved in productivity, and is stabilized as a product.

In the double-row angular bearing of the present invention, it is possible to enhance the yield and productivity of cold rolling products (inner races and/or outer race), to thereby achieve cost reduction. In addition, the inner races and/or the outer race can be endowed with stable processing accuracy and high strength, whereby it is possible to enhance quality of the bearing. Further, it is also possible to achieve weight reduction of the inner races and/or the outer race, to thereby achieve fuel consumption reduction.

In particular, hardness of the blank is set to Rockwell Hardness 30 HRC or less, whereby it is possible to enhance processing accuracy and to form the inner races and/or outer race of high quality. Thus, a bearing to be assembled can be stably provided with inner clearance, and is stabilized as a bearing, with the result that the bearing can be endowed with a longer life. Cold rolling products are excellent in strength and rigidity. Thus, when the outer race is a cold rolling product, conventional elastic bodies are not used any longer. As a result, it is possible to reduce the number of components, to thereby enhance assembly property and achieve cost reduction.

The blank can be made of bearing steel or medium carbon steel, and hence the inner races and the outer race can be stably formed at lower cost. Further, through spheroidizing annealing, processability of cold rolling can be enhanced. Therefore, through spheroidizing annealing, it is possible to facilitate plastic working and machining for the steel, or to improve mechanical properties thereof. In particular, when high carbon steel which includes carbon in amount of 0.77% or more is used and spheroidizing annealing is performed thereon, processability of cold rolling can be further enhanced.

Through the grinding process on the rolling surfaces, it is possible to finish the rolling surfaces with high accuracy. As a result, the rolling elements are allowed to smoothly roll on the rolling surfaces, whereby high-accuracy rotation can be realized.

As described above, in the first wheel bearing device of the present invention, the outer race and the double-row angular bearing are used. As a result, the bearing of high quality is used, whereby the stable function can be exerted for a long period of time.

According to the second wheel bearing device of the present invention, it is possible to provide a lighter-weight and compactified wheel bearing device which has a hub wheel having a higher degree of freedom of setting the shape and dimensions of the corner portion thereof and having higher strength and durability.

Specifically, the corner portion between the shoulder portion of the hub wheel and the smaller-diameter step portion is constituted by the composite R having the curvature radii Rb and Rc. The curvature radius Rb on the side of the shoulder portion is set to be smaller than the maximum curvature radius Ra when the corner R is the single R, where Rb<Ra, and the curvature radius Rc on the side of the smaller-diameter step portion is set to be larger than the maximum curvature radius Ra, where Rc>Ra. With this setting, even when large moment load is applied to the hub wheel through intermediation of the wheel attachment flange during turning of the vehicle, it is possible to suppress stress generated in the corner portion, and to achieve weight reduction and compactification.

Further, it is preferred that the corner portion between the shoulder portion and smaller-diameter step portion of the hub wheel be constituted by the composite R having the curvature radius Rb and the curvature radius Rc and the tangential line smoothly connecting the curvature radius Rb and the curvature radius Rc, the mortar-like recessed part extending in the axial direction be formed by the forging process in the end portion on an outboard side of the hub wheel, and the corner portion have thickness set to be substantially uniform. It is possible to increase minimum thickness of the hub wheel in comparison with that of the hub wheel in which a corner R is a single R, and hence possible to enhance strength and durability of the hub wheel.

Figure 1:
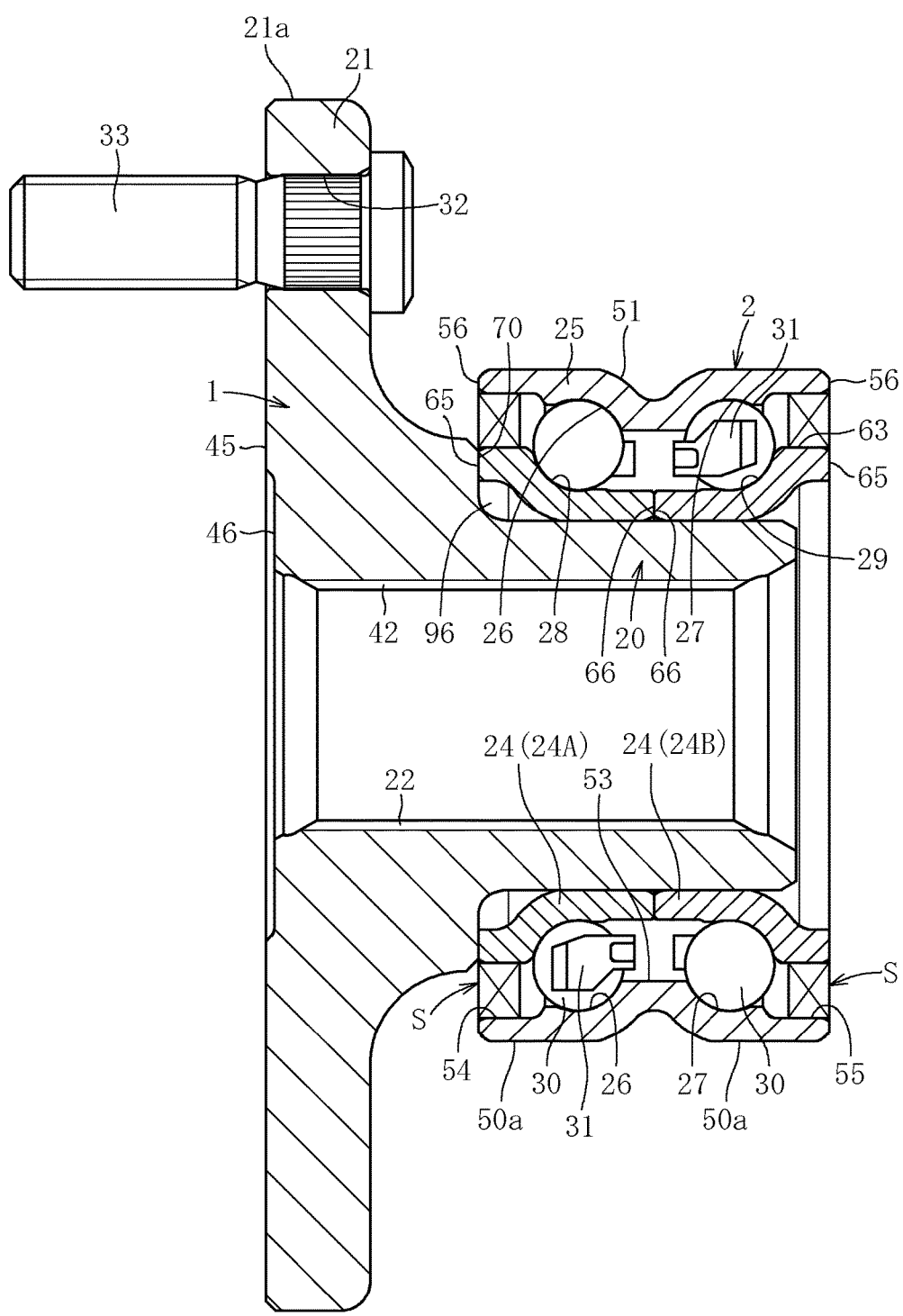
FIG. 1 A vertical sectional view of a wheel bearing device according to a first embodiment of the present invention, in which a double-row angular bearing is used.

REFERENCE SIGNS LIST 2 double-row angular bearing
24 inner race
24A, 24B inner race
24C, 24D inner race
25 outer race
26 outer rolling surface
27 outer rolling surface
28 inner rolling surface
29 inner rolling surface
34 blank
35 circumferentially protruding portion
36 circumferentially protruding portion
71 shoulder portion
72 counterbore

DESCRIPTION OF EMBODIMENTS

Figure 2:
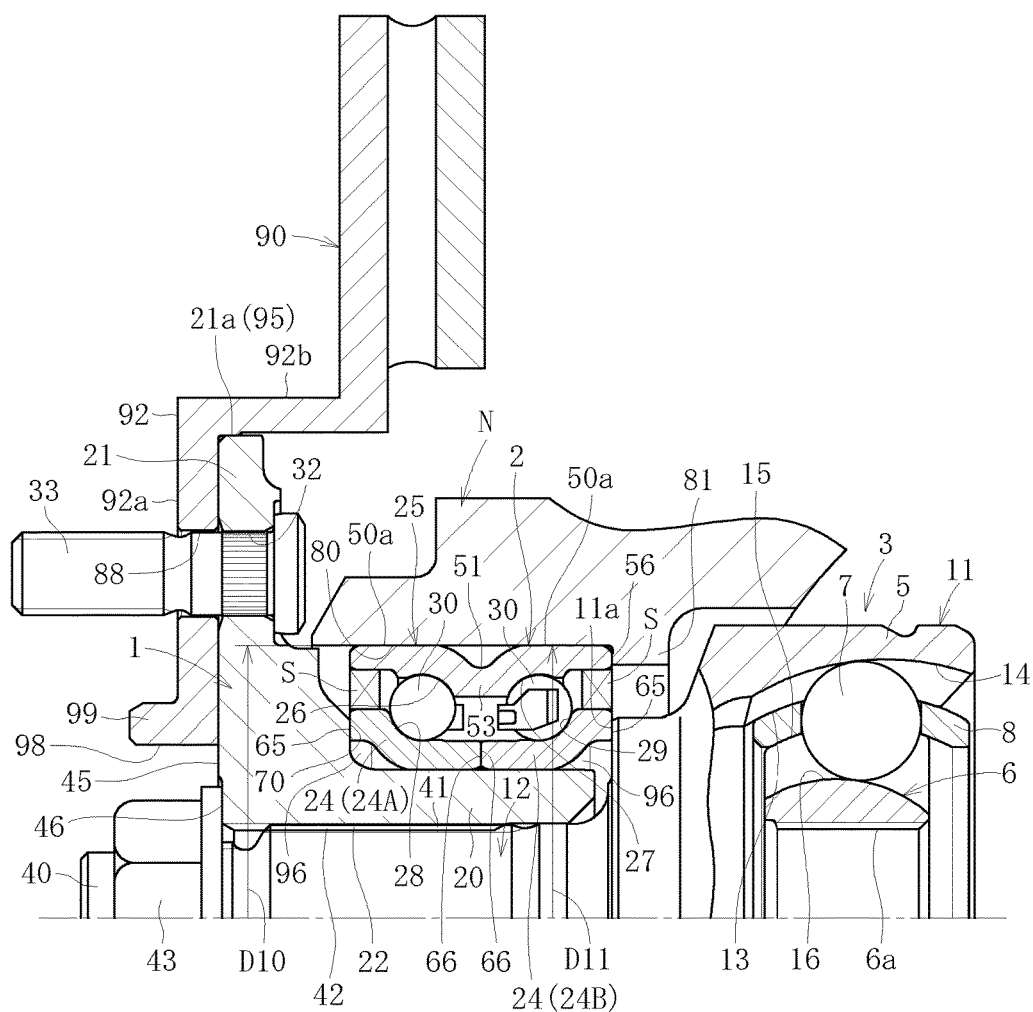
FIG. 2 A sectional view illustrating a state in which the wheel bearing device is mounted to a knuckle.

FIG. 2 illustrates a wheel bearing device in which a double-row angular bearing 2 illustrated in FIG. 1 according to a first embodiment of the present invention. The wheel bearing device is constituted by the following integrated with each other: a hub wheel 1; the double-row angular bearing 2 according to the present invention; and a constant velocity universal joint 3.

The constant velocity universal joint 3 mainly includes the following: an outer race 5 as an outer joint member; an inner race 6 as an inner joint member arranged inside the outer race 5; a plurality of balls 7 interposed between the outer race 5 and the inner race 6 so as to transmit torque; and a cage 8 interposed between the outer race 5 and the inner race 6 so as to retain the balls 7. An end portion of a shaft (not shown) is press-fitted into a shaft-hole inner diameter 6a of the inner race 6 to effect spline fitting, whereby the inner race 6 is coupled to the shaft so as to allow torque transmission.

The outer race 5 includes a mouth section 11 and a stem-shaft section 12, and the mouth section 11 is formed in a cup-like shape open at one end thereof. In an inner spherical surface 13 thereof, there are formed a plurality of axially extending track grooves 14 at equal circumferential intervals. The track grooves 14 extend to the open end of the mouth section 11. The inner race 6 has on an outer spherical surface 15 thereof a plurality of axially extending track grooves 16 formed at equal circumferential intervals.

The track grooves 14 of the outer race 5 and the track grooves 16 of the inner race 6 are paired with each other, and each one of the balls 7 as torque transmission elements is incorporated into a ball track constituted by each pair of the track grooves 14 and 16 so as to be capable of rolling. The balls 7 are interposed between the track grooves 14 of the outer race 5 and the track grooves 16 of the inner race 6 so as to transmit torque. Although the constant velocity universal joint in this case is of the Rzeppa type, it is also possible to adopt a constant velocity universal joint of some other type such as an undercut-free type in which each of the track grooves has a linear straight portion provided to a groove bottom.

The outer race 5 and inner race 6 of the constant velocity universal joint 3 are made, for example, of medium carbon steel such as S53C which includes 0.40 to 0.80 weight % of carbon. The track grooves 14 and 16 and a region from a shoulder portion of the mouth section 11 to an outer peripheral surface (radially outer surface) of the stem shaft 12 are subjected to hardening treatment such as high-frequency quenching so that surface hardness thereof is set approximately to be of from 58 to 64 HRC.

As illustrated in FIG. 1, the hub wheel 1 includes a barrel section 20, and a flange section (wheel attachment flange) 21 provided in an outboard-side end portion of the barrel section 20. Further, the stem shaft 12 of the outer race 5 is inserted into a hole portion 22 of the barrel section 20 of the hub wheel 1. The stem shaft 12 includes a screw portion 40 formed in an end portion thereof on a side opposite to the mouth section. A spline portion 41 is formed between the screw portion 40 and the mouth section 11. Further, another spline portion 42 is formed on an inner peripheral surface (radially inner surface) of the barrel section 20 of the hub wheel 1. When the stem shaft 12 is inserted into the barrel section 20 of the hub wheel 1, the spline portion 41 on the stem shaft 12 side and the spline portion 42 on the hub wheel 1 side are engaged with each other. An outer side of a vehicle in a state in which the bearing is assembled to the vehicle is referred to as an outboard side (left side in FIG. 2), and a center side of the vehicle in the above-mentioned state is referred to as an inboard side (right side in FIG. 2).

Then, a nut member 43 is screwed to the screw portion 40 of the stem shaft 12, the screw portion 40 protruding from the barrel section 20. Thus, the hub wheel 1 and the outer race 5 are coupled to each other. In this case, a bolt insertion hole 32 is provided in the flange section 21 of the hub wheel 1, and a hub bolt 33 is mounted into the bolt insertion hole 32. Note that, the hub wheel 1 is made, for example, of the medium carbon steel such as S53C which includes 0.40 to 0.80 weight % of carbon. Further, a radially outer surface of the barrel section 20 (from a radially outer surface of a hub-wheel smaller-diameter step portion serving as a bearing fitting portion to an end surface 70) maybe subjected to the hardening treatment such as high-frequency quenching so that surface hardness thereof is set approximately to be of from 58 to 64 HRC.

The double-row angular bearing (double-row angular ball bearing) 2 includes the following: an outer race 25 as an outer member having double-row outer rolling surfaces 26 and 27 formed on an inner periphery thereof; a pair of inner races 24A and 24B having inner rolling surfaces 28 and 29 formed on outer peripheries thereof, the inner rolling surfaces 28 and 29 being opposed respectively to the outer rolling surfaces 26 and 27 of the outer race 25; and double-row rolling elements 30 rollably housed between the outer rolling surfaces 26 and 27 of the outer race 25 and the inner rolling surfaces 28 and 29 of the inner races 24A and 24B. The rolling elements 30 are retained by cages 31 interposed between the outer race 25 and the inner races 24A and 24B. Seals S are inserted into both opening portions of the double-row angular ball bearing (roller bearing) 2 (opening portions between the outer race 25 and the inner races 24A and 24B).

In the outer race 25, an annular recessed portion 51 is formed at an axial center portion of a radially outer surface 50 thereof, and a circumferentially protruding portion (swelling portion) 53 is provided at an axial center portion of a radially inner surface 52 thereof so as to correspond to the annular recessed portion 51. The outer rolling surfaces 26 and 27 are formed on both sides of the circumferentially protruding portion 53, and further, seal fitting portions (seal grooves) 54 and 55 are formed outside the outer rolling surfaces 26 and 27. As described later, of the radially outer surface 50 of the outer race 25, a part except the annular recessed portion 51 serves as fitting surfaces 50a and 50a press-fitted into the knuckle N.

Figure 7:
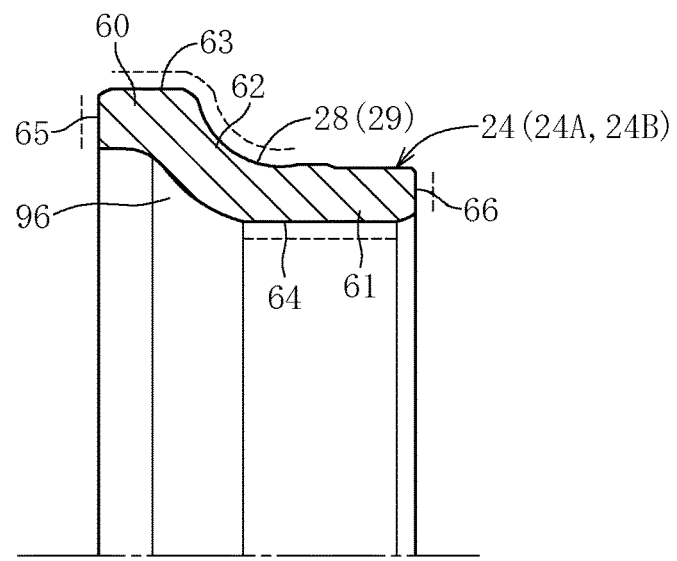
FIG. 7 A sectional view of a bearing inner race of the wheel bearing device.

The outboard-side inner race 24 (24A) and the inboard-side inner race 24 (24B) can be formed of a common component. As illustrated in FIG. 7, each of the inner races 24A and 24B is constituted by the following: a larger-diameter portion (larger-end portion) 60; a smaller-diameter portion (smaller-end portion) 61; and a tapered portion 62 between the larger-diameter portion 60 and the smaller-diameter portion 61. In this case, a radially outer surface of the larger-diameter portion 60 serves as a seal mounting portion (shoulder portion) 63, and a radially outer surface of the tapered portion 62 serves as the rolling surface 28 (29). Further, a radially inner surface of the smaller-diameter portion 61 serves as a hub-wheel fitting surface 64. In this case, the larger-diameter portion 60 and the smaller-diameter portion 61 have substantially the same thickness, and hence a thickness-reduced portion 96 is formed on a radially inner side of the larger-diameter portion 60.

Figure 3:
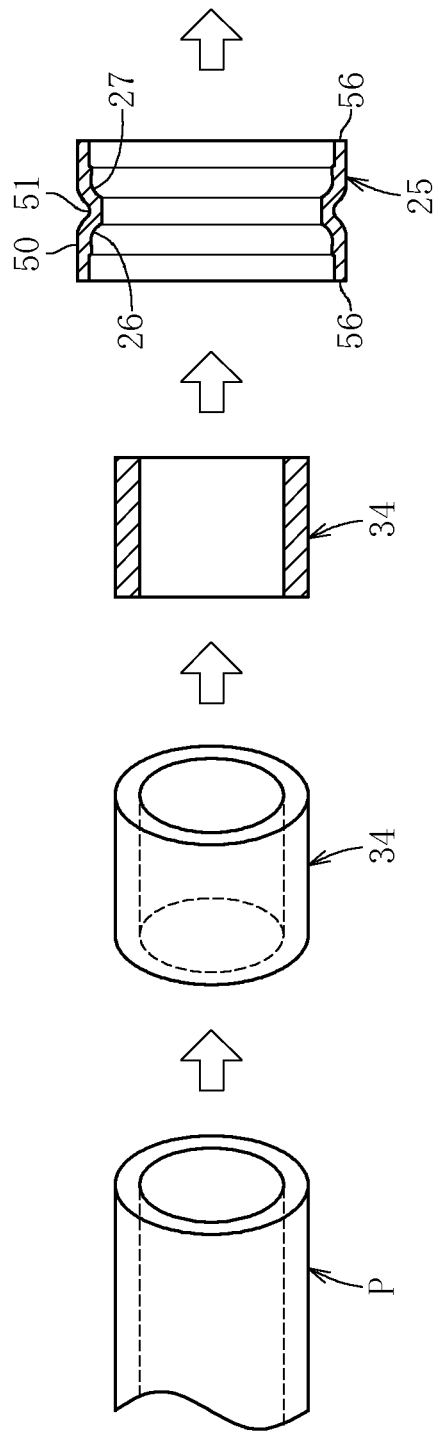
FIG. 3 A schematic view illustrating processing steps for an outer race of the double-row angular bearing.

Next, description is made of a method of manufacturing the outer race 25 of the angular ball bearing (roller bearing) 2. In the method of manufacturing an outer race, as illustrated in FIG. 3, a long pipe material P is cut to a predetermined dimension so that a short blank 34 is formed. After that, a cold rolling process is performed on the blank 34. Cold rolling is a processing method of milling a blank (formation raw material) while rotating the same at normal temperature without applying heat thereto. Specifically, cold rolling is a processing method of forming a work (finished product after processing) in the following manner: the blank having inner and outer diameters smaller than those of the work is sandwiched between two jigs (for radially inner and outer surfaces) designed for achieving a shape into which the blank is desired to be processed; and the blank is then milled (rolled) while being rotated.

Figure 4:
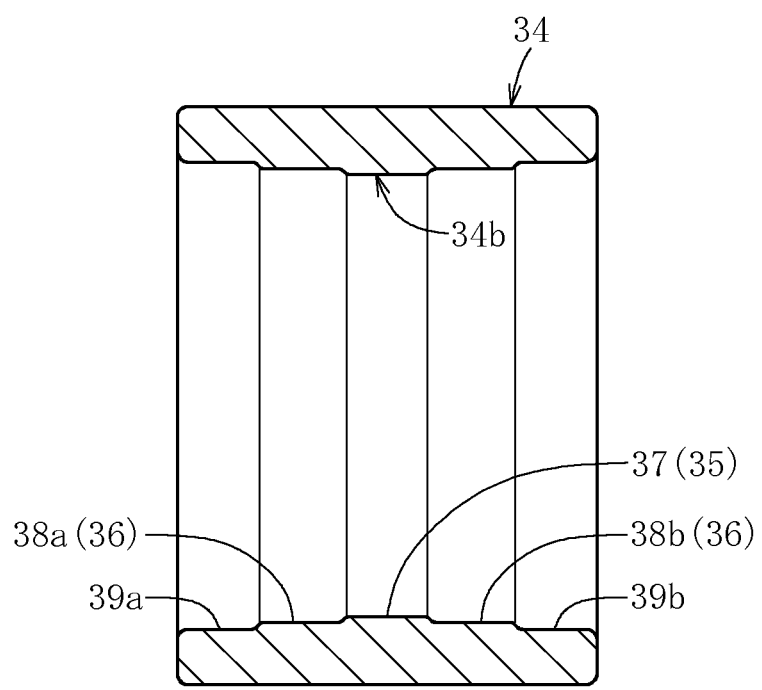
FIG. 4 A sectional view of a blank as a material for the outer race of the double-row angular bearing.

Specifically, as illustrated in FIG. 4, it is preferred that the blank 34 include the following formed on a radially inner surface 34b thereof: a smaller-diameter portion 37 in the axial center portion; intermediate-diameter portions 38a and 38b provided on both axial sides of the smaller-diameter portion 37; and larger-diameter portions 39a and 39b provided on opening portion sides thereof.

The outer-race raw material (blank) 34 is subjected to spheroidizing annealing so that hardness thereof is set to Rockwell Hardness 30 HRC or less, preferably, 25 HRC or less. Specifically, the following are used as the blank 34: high-carbon chrome bearing steel such as SUJ2 which is subjected to spheroidizing annealing so as to have hardness of from 80 to 94 HRB; or carbon steel which includes carbon in amount of from 0.45 to 0.80 weight % and chrome in an amount of less than 1.0 weight % and is subjected to spheroidizing annealing so as to have hardness of from 80 to 88 HRB. Incidentally, spheroidizing annealing is thermal treatment of spheroidizing carbides in steel and uniformly dispersing the carbides thereinto. Therefore, through spheroidizing annealing, it is possible to facilitate plastic working and machining for the steel, or to improve mechanical properties thereof. In detail, annealing is a process of causing a metal material in an unstable state during processing steps to enter a stable state with thermal treatment. The metal material is heated to a certain temperature and then annealed (slowly cooled). Under an annealed state, the metal is not only in the most stable state, but also in a soft state. Composition modulation for forming carbide ($Fe_3c$) in steel into a fine spherical shape at the time of annealing is referred to as spheroidizing annealing.

Figure 5:
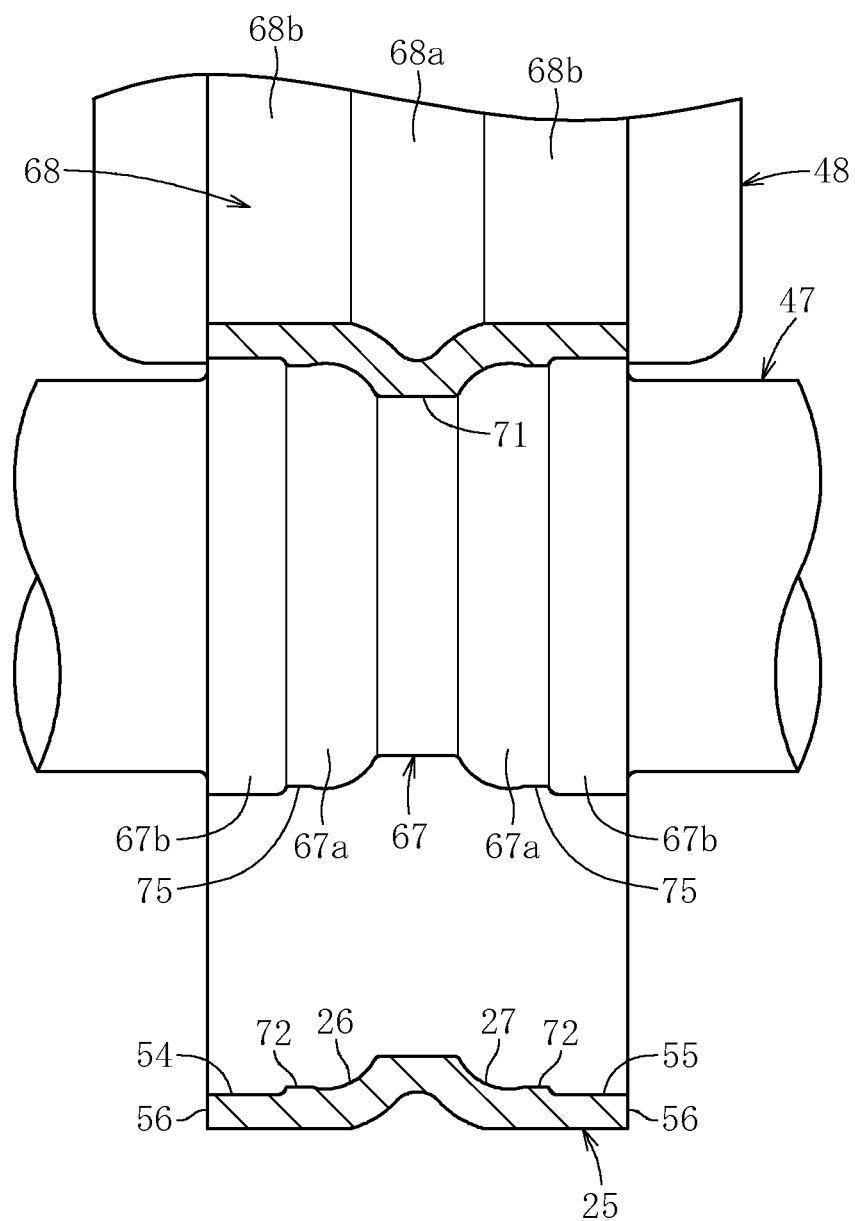
FIG. 5 A schematic view of an outer-race forming state of a cold rolling machine.

In a cold rolling step, the cold rolling process is performed with a rolling machine as illustrated in FIG. 5. The rolling machine includes a mandrel 47 for a radially inner surface and a forming roll 48 for a radially outer surface. On an outer peripheral surface of the mandrel 47, there is formed an outer-race-radially-inner-surface forming section 67 which forms the radially inner surface of the outer race 25. On a radially outer surface of the forming roll 48, there is formed an outer-race-radially-outer-surface forming section 68 which forms the radially outer surface of the outer race 25.

The outer-race-radially-inner-surface forming section includes rolling-surface forming portions 67a and 67a and seal-fitting-portion forming portions 67b and 67b. In the rolling-surface forming portions 67a and 67a, counterbore forming portions 75 and 75 for forming counterbores are formed on seal-fitting-portion forming portion sides. Further, the outer-race-radially-outer-surface forming section 68 includes an annular-recessed-portion forming portion 68a and press-fitting-surface forming portions 68b and 68b.

In this case, under a state in which the blank 34 is externally fitted to the mandrel 47 and the blank 34 is sandwiched by the mandrel 47 and the forming roll 48, the forming roll 48 is rotated about an axial center thereof. The outer race 25 can be formed in this manner. That is, the intermediate-diameter portions 38a and 38b constitute the rolling surfaces 26 and 27, and the larger-diameter portions 39a and 39b constitute the seal fitting portions 54 and 55.

On a radially inner surface of the blank 34, a first circumferentially protruding portion 35 is constituted by the smaller-diameter portion 37, and second circumferentially protruding portions 36 are constituted by the intermediate-diameter portions 38a and 38b. The first circumferentially protruding portion 35 constitutes a shoulder portion 71 between the rolling surfaces 26 and 27, and the second circumferentially protruding portions 36 constitute counterbores 72 and 72.

Side end surfaces 56 of the blank 34 provided with the rolling surfaces 26 and 27 and the like are reshaped by a latching process. Then, the blank 34 is hardened by quenching/tempering in a heating furnace or the like, and then subjected to a grinding process (polishing process). In this case, surfaces except the side end surfaces 56 are formed by a cold rolling process or a grinding process. Regarding quenching, any of immersion quenching and high-frequency quenching may be performed as long as the blank 34 is made of high-carbon chrome bearing steel such as SUJ2. Further, in order to secure surface hardness required as that of rolling surfaces, high-frequency quenching is preferred when the blank 34 is made of carbon steel which includes carbon in amount of from 0.45 to 0.80 weight % and chrome in an amount of less than 1.0 weight %. Incidentally, immersion quenching is a method of forming the work as a whole into hard composition in such a manner that the work as a whole (to a depth thereof) is heated up to a required temperature with an electric furnace and the like and is then rapidly cooled. High-frequency quenching is a method of forming only a surface of a work into composition of high hardness in such a manner that the work is put between coils through which high-frequency currents flow, and the surface is heated by Joule heat caused by overcurrents generated on surfaces of the coils and is then rapidly cooled. Further, the side end surfaces 56 may be reshaped by a latching process (quenched steel trimming) or grinding process after quenching/tempering.

Figure 6:
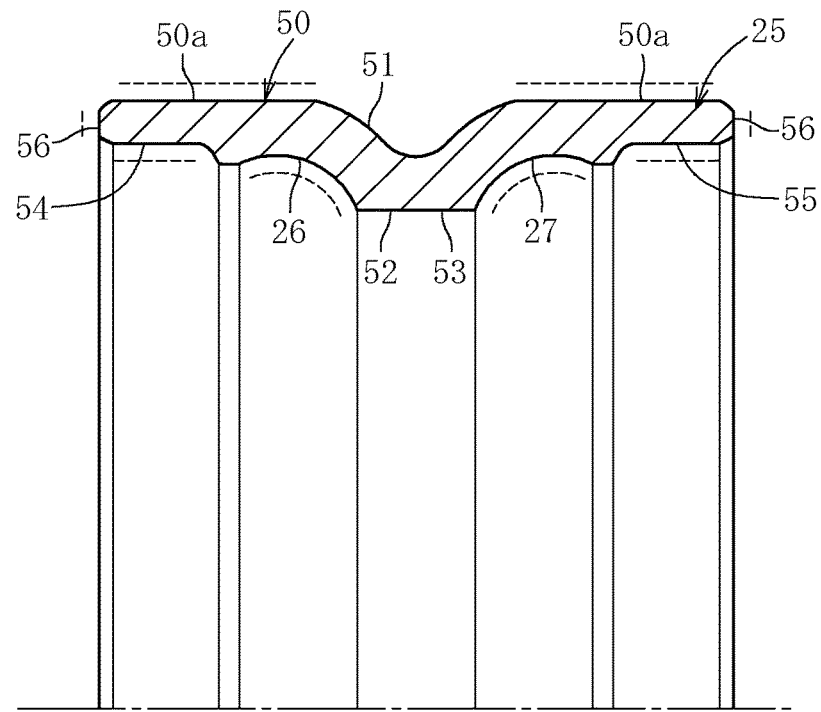
FIG. 6 An enlarged sectional view of the outer race of the double-row angular bearing.

Further, the blank 34 provided with the rolling surfaces 26 and 27 and the like is quenched in a heating furnace or the like so that the surface thereof is hardened, and then the blank 34 may be subjected to a trimming process. In this case, as illustrated by the broken lines of FIG. 6, trimming is performed on the following: the seal fitting portions 54 and 55 on the axial end portions of the radially inner surface 52; the rolling surfaces 26 and 27; the end surfaces (side end surfaces) 56 and 56; and the fitting surfaces 50a and 50a of the radially outer surface. Therefore, trimming performed thereon can be referred to as quenched steel trimming. Specifically, the quenched steel trimming simply means trimming, and the trimming is usually performed on a material in a raw state. Thus, the trimming herein is referred to as the quenched steel trimming in order to clarify that material is trimmed after being subjected to the thermal treatment (after being quenched). The trimming is performed after the raw material is quenched, and hence deformation of the raw material by the thermal treatment can be removed in the trimming process. When quenching is performed on the material, a tensile residual stress is liable to remain therein, and fatigue strength thereof is reduced when the material is left as it is. Therefore, when the surface is trimmed, a compressive residual stress can be imparted to an outermost-surface portion thereof, whereby the fatigue strength is enhanced. Note that, quenching is thermal treatment for increasing hardness and strength of steel in the following manner: the steel is heated up to an appropriate temperature equal to or higher than a transformation point; and then is rapidly cooled by being put into water, oil, or the like. (The transformation point is a heating-upper-limit temperature below which metal composition does not start to change.)

When the cold rolling process was performed on an outer-race blank 34 made of high-carbon chrome bearing steel SUJ2 which had been subjected to spheroidizing annealing so as to have hardness of 94 HRB, microcracks did not occur. However, when the cold rolling process was performed on an outer-race blank 34 made of carbon steel S53C which had been subjected to spheroidizing annealing so as to have hardness of from 89 to 94 HRB, microcracks occurred in parts on shoulder portion 71 sides of the rolling surfaces 26 and 27, the counterbores 72, and a bottom section of the annular recessed portion 51. Meanwhile, microcracks did not occur at hardness of 88 HRB or smaller.

Similarly to the outer race 25, each of the inner races 24 is also formed by cold rolling of an inner-race raw material having a raw shape substantially the same as the shape of each of the inner races 24. The raw material is hardened by being quenched/tempered in a heating furnace or the like, and then the raw material is subjected to a grinding process (polishing process). That is, the surfaces of the raw material are formed by a cold rolling process or a grinding process.

The inner races 24 as described above may be formed in the following manner: the inner-race raw material having a raw shape the same as the shape of each of the inner races 24 is subjected to cold rolling; the raw material is quenched in a heating furnace or the like so that the surface thereof is hardened; and then the raw material is subjected to a trimming process. That is, the inner races 24 may be formed by quenched steel trimming. In this case, as illustrated by the broken lines of FIG. 7, quenched steel trimming is performed on the following: the hub-wheel fitting surface 64, both end surfaces 65 and 66, the seal mounting portion 63, and the rolling surface 28 (29). A material used for the inner races 24 is similar to that for the outer race 25. Similarly to the outer-race raw material, the inner-race-forming raw material (blank) in this case is subjected to spheroidizing annealing so that hardness thereof is set to Rockwell Hardness 30 HRC or less, preferably, 25 HRC or less.

Figure 8:
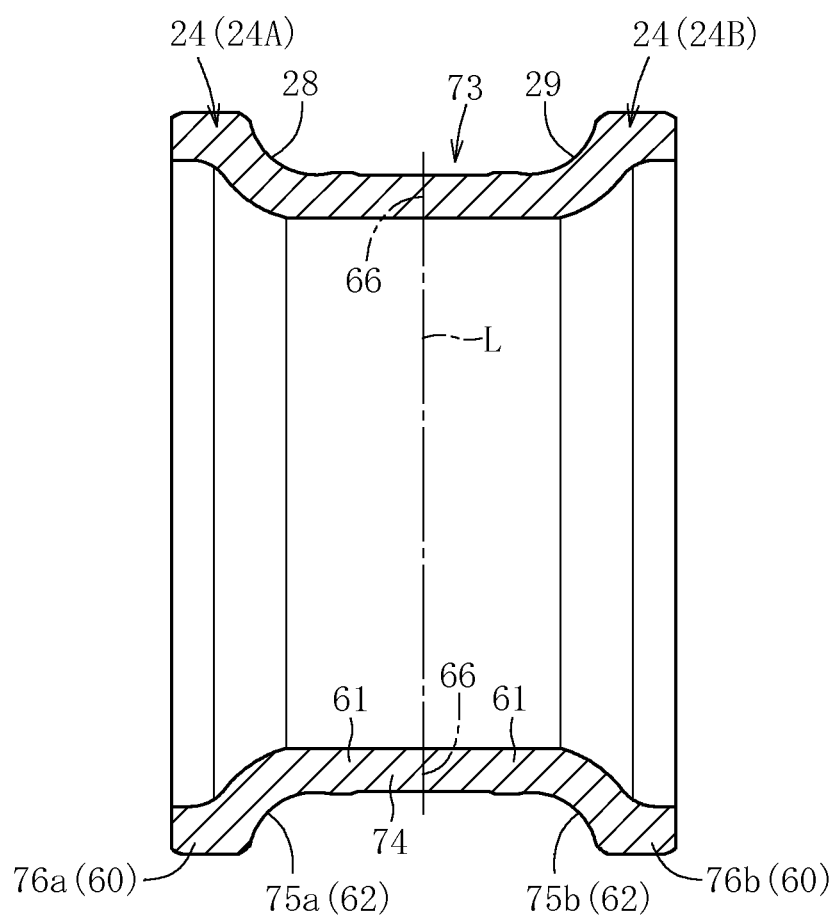
FIG. 8 A sectional view illustrating a method of manufacturing the bearing inner race of the wheel bearing device illustrated in FIG. 1.

Incidentally, regarding the inner races 24, as illustrated in FIG. 8, for example, first, an inner-race-forming raw material 73 (material having a shape in which a pair of inner races are coupled integrally to each other) can be formed by cold rolling of a hollow bearing-steel material. Specifically, the inner-race-forming raw material 73 is constituted by a cylindrical body having the following: a cylindrical body portion 74 in an axial center thereof; and larger-diameter end portions 76a and 76b provided continuously with both ends of the body portion 74 through intermediation of taper portions 75a and 75b.

The inner-race-forming raw material 73 thus configured is cut at an axial center thereof so that a pair of inner races 24 (24A) and 24 (24B) are formed. That is, the inner-race-forming raw material 73 is cut along a centerline L. In this case, the inner-race-forming raw material 73 is quenched in a heating furnace or the like so that the surface thereof is hardened, and then the inner-race-forming raw material 73 is subjected to a cold rolling process or a grinding process. In this manner, the larger-diameter end portion 76a and 76b serves as the larger-diameter portion 60 of the inner race 24, the smaller-diameter body portion 74 serves as the smaller-diameter portion 61 of the inner races 24, and the radially outer surface of the taper portion 75a and 75b serves as the inner rolling surface 28 (29) of the inner race 24. Alternatively, the inner-race-forming raw material 73 is quenched in a heating furnace or the like so that the surface thereof is hardened, and then the inner-race-forming raw material 73 may be subjected to cutting or a trimming process (quenched steel trimming). In this case, quenched steel trimming is performed on the hub-wheel fitting surface 64, both the end surfaces 65 and 66, the seal mounting portion 63, and the rolling surface 28 (29). Note that, such work of cutting the inner-race-forming raw material 73 into two may be performed before the thermal treatment or after the thermal treatment. The inner-race-forming raw material 73 in this case is also subjected to spheroidizing annealing so that hardness thereof is set to Rockwell Hardness 30 HRC or less, preferably, 25 HRC or less.

Figure 9:
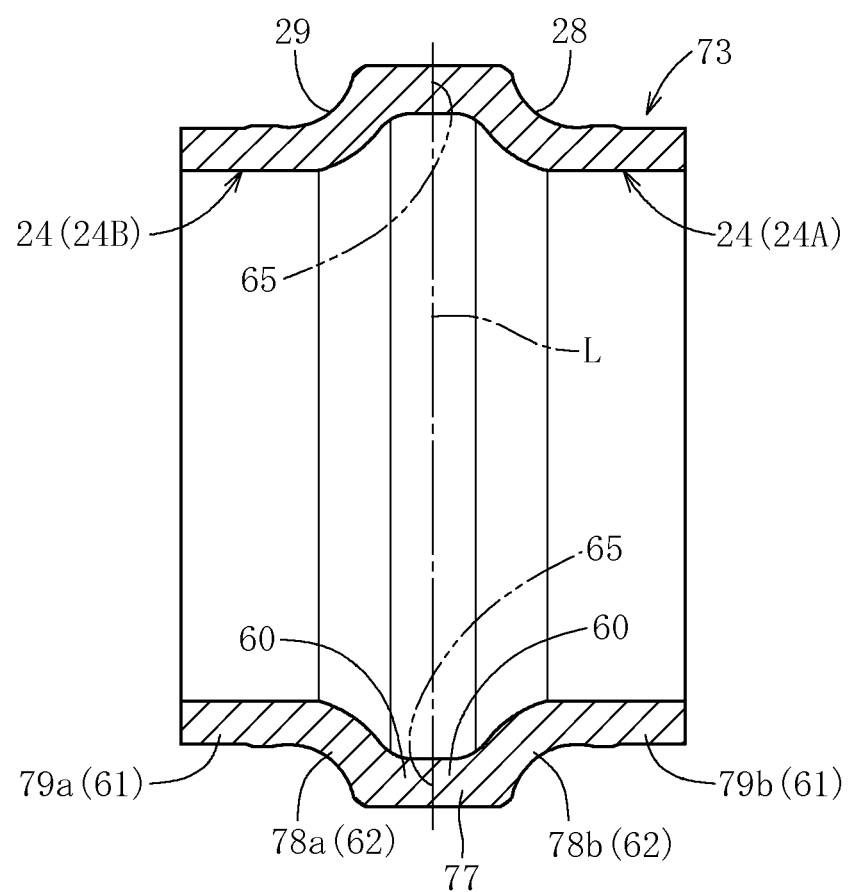
FIG. 9 A sectional view illustrating another method of manufacturing the bearing inner race of the wheel bearing device illustrated in FIG. 1.

The inner-race-forming raw material 73 may be a material having a shape as illustrated in FIG. 9. The inner-race-forming raw material 73 as illustrated in FIG. 9 is constituted by a cylindrical body having the following: a larger-diameter portion 77 in an axial center thereof; and smaller-diameter end portions 79a and 79b provided continuously with both ends of the larger-diameter portion 77 through intermediation of taper portions 78a and 78b.

The inner-race-forming raw material 73 is also cut along the centerline L. In this case, the inner-race-forming raw material 73 is quenched in a heating furnace or the like so that the surface thereof is hardened, and then the inner-race-forming raw material 73 is subjected to cutting or a trimming process. Note that, in the inner-race-forming raw material 73 illustrated in FIG. 8, cut end surfaces thereof become the smaller-diameter-side end surfaces (smaller-end surfaces) 66. Meanwhile, in the inner-race-forming raw material 73 illustrated in FIG. 9, cut end surfaces thereof become the larger-diameter-side end surfaces (larger-end surfaces) 65.

Next, description is made of a method of assembling the wheel bearing device configured as described above. First, as illustrated in FIG. 1, a unit body is configured in which the bearing 2 is incorporated into the hub wheel 1. Specifically, the fitting surfaces 64 and 64 of the inner races 24A and 24B of the bearing 2 in an assembled state are press-fitted onto the barrel section 20 of the hub wheel 1. In this case, the end surface (larger-end surface) 65 of the inner race 24A comes into contact with the cutout-portion end surface 70 of the hub wheel 1.

The unit body thus assembled and the outer race 5 of the constant velocity universal joint 3 are coupled to each other. In this case, the stem shaft 12 of the outer race 5 is inserted into the hole portion 22 of the hub wheel 1, and the nut member 43 is screwed to the screw portion 40 protruding from the hole portion 22 to the outboard side. In this manner, a back surface 11a of the mouth section 11 comes into contact with the end surface 65 of the inner race 24B on the inboard side.

Therefore, under a state in which the end surfaces (hitting surfaces) 66 of the pair of inner races 24A and 24B are hit against each other, the pair of inner races 24A and 24B are sandwiched between the cutout-portion end surface 70 and the back surface 11a of the mouth section 11. In this state, pre-load can be imparted to the inner races 24A and 24B.

In the wheel bearing device configured as described above, the knuckle fitting surface 50a of the outer race 25 of the double-row angular ball bearing 2 is press-fitted onto a radially inner surface 80 of the knuckle N. In this case, an outer diameter dimension D11 of the knuckle fitting surface 50a is set to be slightly larger than an inner diameter dimension D10 of the radially inner surface 80 of the knuckle N. That is, the dimensions D10 and D11 are set so that, with a tightening margin between the knuckle fitting surface 50a and the radially inner surface 80 of the knuckle, relative shifts between the knuckle N and the outer race 25 in the axial and circumferential directions can be regulated.

In this case, for example, a value obtained by dividing the fitting load by equivalent radial load of the roller bearing is defined as a creep-generating limit coefficient. Design specifications of the outer race 25 are set in consideration of the creep-generating limit coefficient in advance.

Therefore, with the tightening margin between the knuckle fitting surface 50a and the radially inner surface 80 of the knuckle, axial detachment of the outer race 25 and a circumferential creep thereof are prevented. Incidentally, the creep is as follows: the bearing slightly moves in the circumferential direction owing to a shortage of the fitting tightening-margin, processing inaccuracy of the fitting surface, and the like, with the result that the fitting surface is converted into a mirror surface; and the bearing is burnt out or fused to the knuckle while involving galling in some cases.

Further, a swelling portion 81 protruding to the radially inner side is provided on the radially inner surface 80 of the knuckle. The bearing 2 is press-fitted from the outboard side, whereby the inboard-side end surface 56 of the outer race 25 comes into contact with the swelling portion 81.

As illustrated in FIG. 2, a brake rotor 90 is mounted to the hub wheel 1. The brake rotor 90 includes a short cylindrical center mounting portion 92 having an axial center hole 98, and the center mounting portion 92 comes into contact with the flange section 21 of the hub wheel 1.

The center mounting portion 92 includes a disc portion 92a having a through-hole, and a short cylindrical portion 92b extended from a radially outer portion of the disc portion 92a to the inboard side. On a peripheral edge portion of the through-hole of the disc portion 92a, an outer collar portion 99 extended to the outboard side is provided. The axial center hole 98 is constituted by a radially inner hole of the outer collar portion 99, and the through-hole of the disc portion 92a.

In this case, the disc portion 92a comes into contact with an outboard-side end surface of the hub wheel 1 (hub-wheel end surface constituted by the outboard-side end surface 45 of the barrel section 20, and by an outboard-side end surface of the flange section 21, the outboard-side end surface being arranged flush and continuously with the end surface 45). In addition, a radially inner surface of the short cylindrical portion 92b on the disc portion 92a side comes into contact with a radially outer portion 21a of the flange section 21 of the hub wheel 1. That is, the radially outer portion 21a of the flange section 21 of the hub wheel 1 constitutes a brake pilot portion 95 which guides the brake rotor 90. Note that, the disc portion 92a is provided with a through-hole 88 through which the hub bolt 33 are inserted.

As described above, the brake rotor 90 is mounted, whereby a radially outer surface of the outer collar portion 99 constitutes a wheel pilot portion fitted to an inner periphery of the wheel (not shown).

According to the method of manufacturing an outer race of the present invention, the outer race 25 is formed by the cold rolling process, and hence it is possible to enhance the yield and productivity of the product and to achieve cost reduction. In addition, the outer race 25 can be endowed with stable processing accuracy, a longer life, and high strength, whereby it is possible to enhance quality of the bearing 2. Further, it is also possible to achieve weight reduction of the outer race 25, to thereby achieve fuel consumption reduction. In particular, in the double-row angular bearing, it is possible to enhance the yield and productivity of the cold rolling product (inner races and an outer race), to thereby achieve cost reduction. In addition, the inner races 24 and the outer race 25 can be endowed with stable processing accuracy and high strength, whereby it is possible to enhance quality of the bearing. Further, it is also possible to achieve weight reduction of the inner races 24 and outer race 25, to thereby achieve fuel consumption reduction.

Further, the blank 34 is provided with the circumferentially protruding portion 35 (smaller-diameter portion 37) as the shoulder portion 71 between the rolling surfaces 26 and 27. Thus, the thickness sufficiency of the outer-race-rolling-surface shoulder portion becomes good, whereby occurrence of microcracks is eliminated. As a result, even when the bearing inclines by moment load from a tire during turning of the vehicle and when the rolling elements 30 pass near the shoulder portion 71, microcracks do not occur, and hence a rolling life of the bearing is not adversely affected thereby. Thickness of the shoulder portion 71 is not insufficient and the shape of the shoulder portion does not vary, and hence no individual differences occur as to whether or not the rolling elements 30 climb onto the shoulder portion 71. Further, the circumferentially protruding portions 36 (intermediate-diameter portions 38a and 38b) which constitute the counterbores 72 are provided on the radially inner surface of the blank 34. Thus, when milling (cold rolling) is started, the circumferentially protruding portions 36 bite into recessed portions (counterbore forming portions 75 and 75) of the mandrel 47. With this configuration, the blank 34 can be positioned just in a center in a width direction of a space between the forming roll 48 and the mandrel 47, and a behavior of the raw material 34 at an early stage of the milling is stabilized. As a result, the milling is performed uniformly right and left, and thickness sufficiency also becomes uniform right and left. That is, it is possible to suffice the thickness of the spots at which microcracks are liable to occur, to thereby form high-quality products.

In addition, it is possible to omit the following work: "in order to remove microcracks and thickness-insufficient parts, subjecting the blank to CRF into a shape of having large thickness and being provided with a cut margin, and removing the cut margin after CRF," to thereby enhance the productivity and achieve cost reduction.

Further, through spheroidizing annealing, it is possible to facilitate plastic working and machining for the steel, or to improve mechanical properties thereof. Thus, the wheel bearing device can be further improved in productivity, and is stabilized as a product.

The surfaces of the outer race except the side end surfaces 56 may be formed by a cold rolling process or a grinding process, and hence the outer race is excellent in processing properties. In addition, the material cost and processing cost can be reduced.

In the wheel bearing device of the present invention, the outer race 25 is used in the double-row angular bearing. As a result, the bearing 2 of high quality is used, whereby the function can be stably exerted for a long period of time.

In particular, hardness of the blank 34 is set to Rockwell Hardness 30 HRC or less, whereby it is possible to enhance processing accuracy and to form the inner races 24 and outer race 25 of high quality. Thus, a bearing to be assembled can be stably provided with inner clearance, and is stabilized as a bearing, with the result that the bearing can be endowed with a long life. Further, cold rolling products are excellent in strength and rigidity. Thus, when the outer race 25 is a cold rolling product, conventional elastic bodies are not used any longer. As a result, it is possible to reduce the number of components, to thereby enhance assembly property and achieve cost reduction.

In the wheel bearing device in which the inner-race-forming raw material 73 is used as illustrated in FIG. 8 and FIG. 9, when the inner-race-forming raw material 73 formed by cold rolling is cut at the axial center thereof, the pair of inner races 24A and 24B can be formed. In other words, the pair of inner races 24A and 24B are individually formed by cold rolling. When the inner races 24A and 24B are formed by cold rolling as described above, it is possible to enhance yield and productivity, and to realize stable processing accuracy.

In addition, the thickness of each of the inner races is set to be substantially the same over the entire axial length thereof, and the thickness-reduced portions 96 (refer to FIG. 1, for example) formed by a non-trimming process can be formed stably and reliably on the radially inner portions on both the axial end portion sides. Thus, weight reduction of the manufactured inner races 24A and 24B can be achieved.

Figure 21:
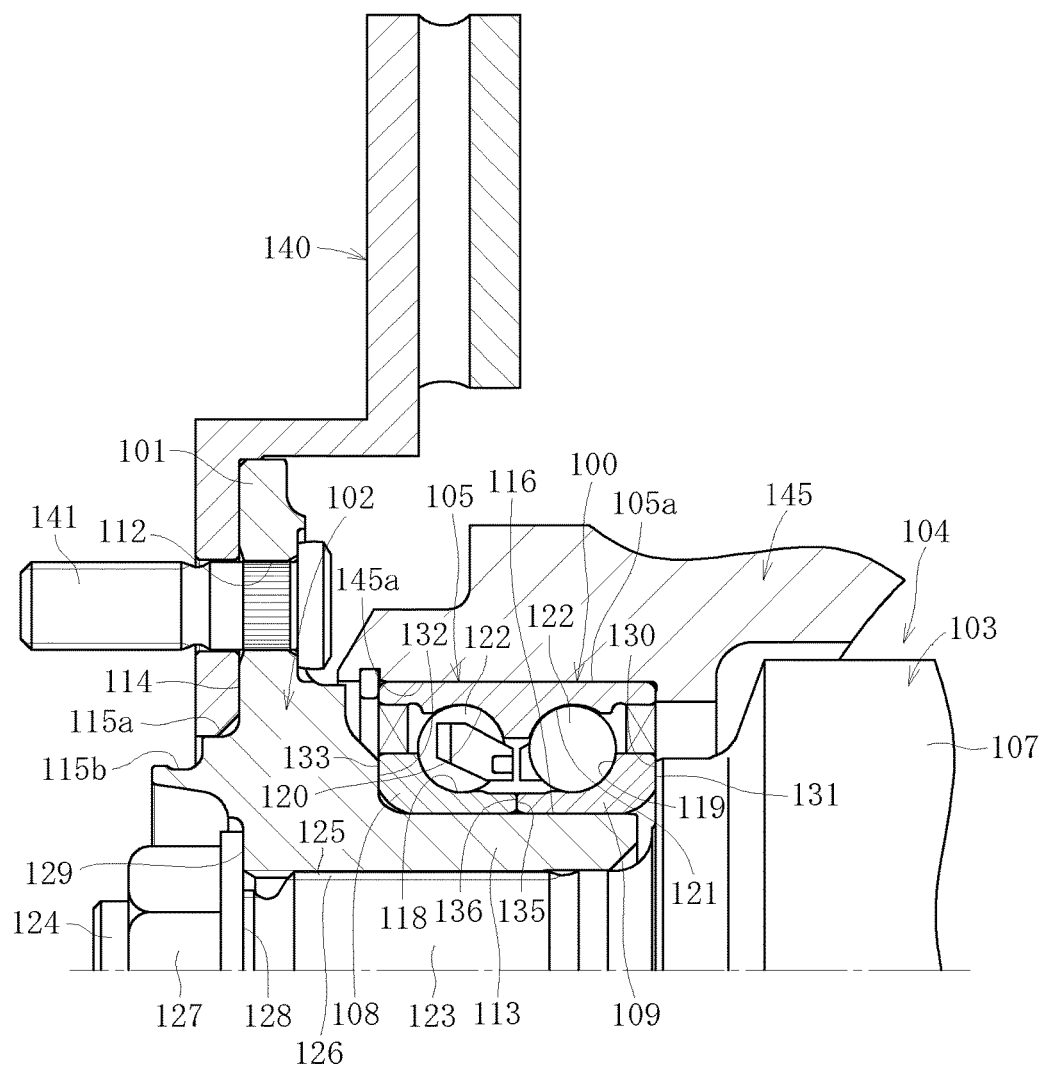
FIG. 21 A sectional view of a wheel bearing device in which a conventional bearing is used.
Figure 22:
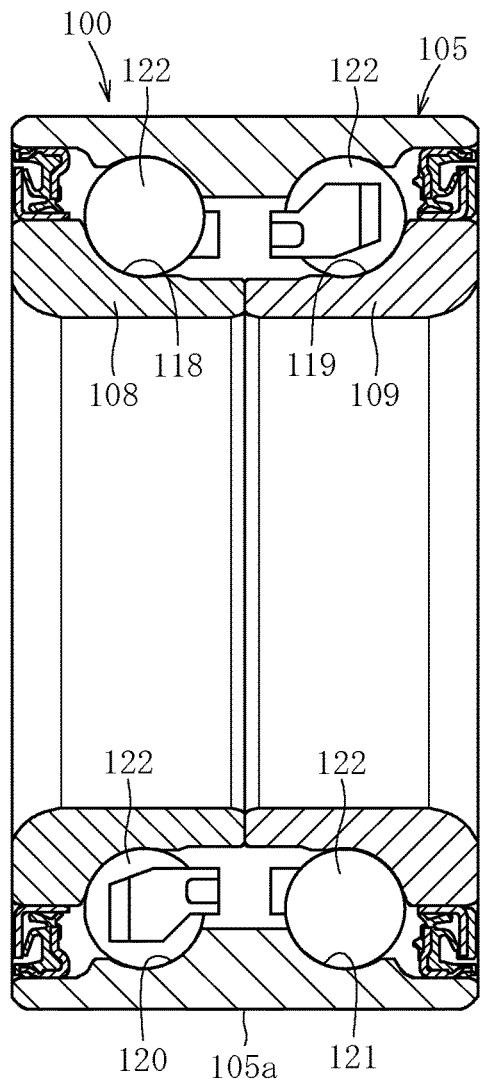
FIG. 22 A vertical sectional view of the conventional bearing.
Figure 23:
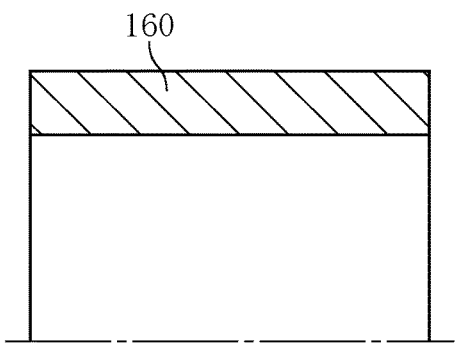
FIG. 23 A sectional view of a blank to be formed by cold rolling into an outer race of the conventional bearing.
Figure 24:
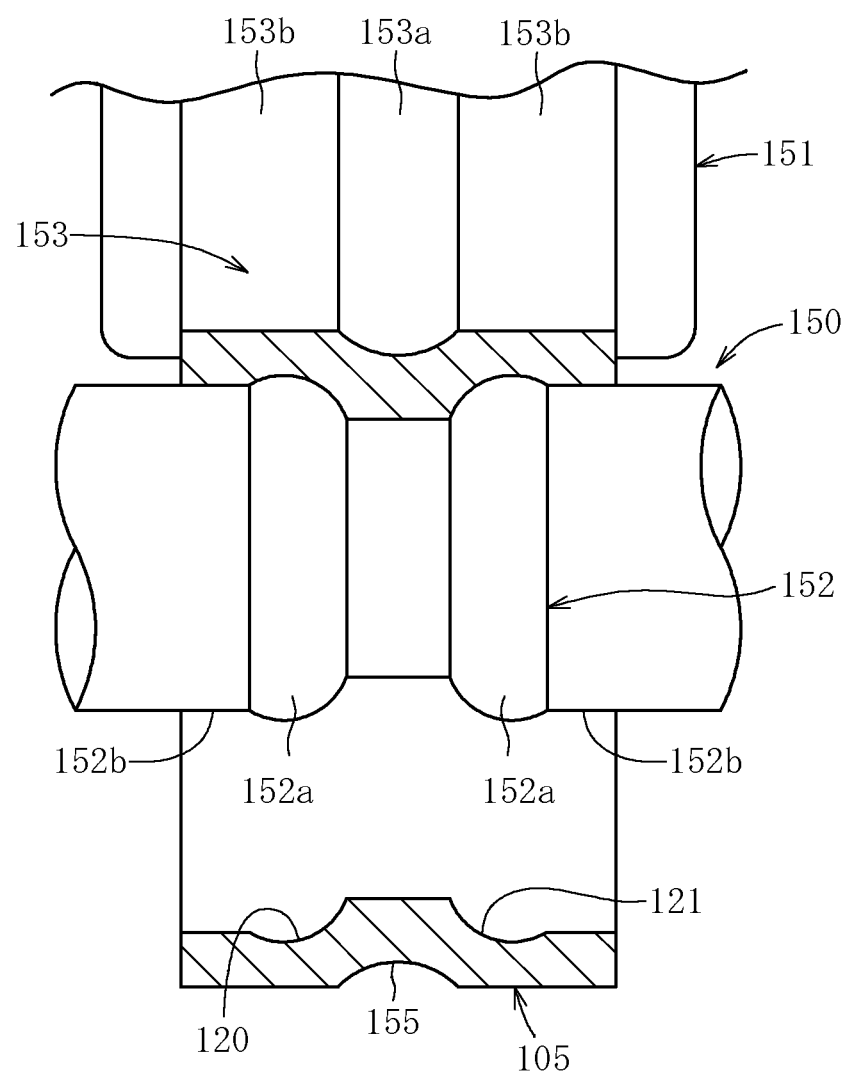
FIG. 24 A schematic view of a conventional outer-race forming state of a cold rolling machine.
Figure 25:
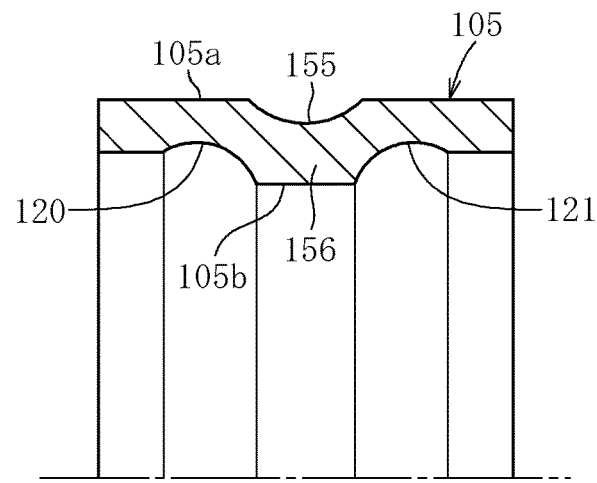
FIG. 25 A sectional view of the outer race of the conventional bearing.
Figure 26:
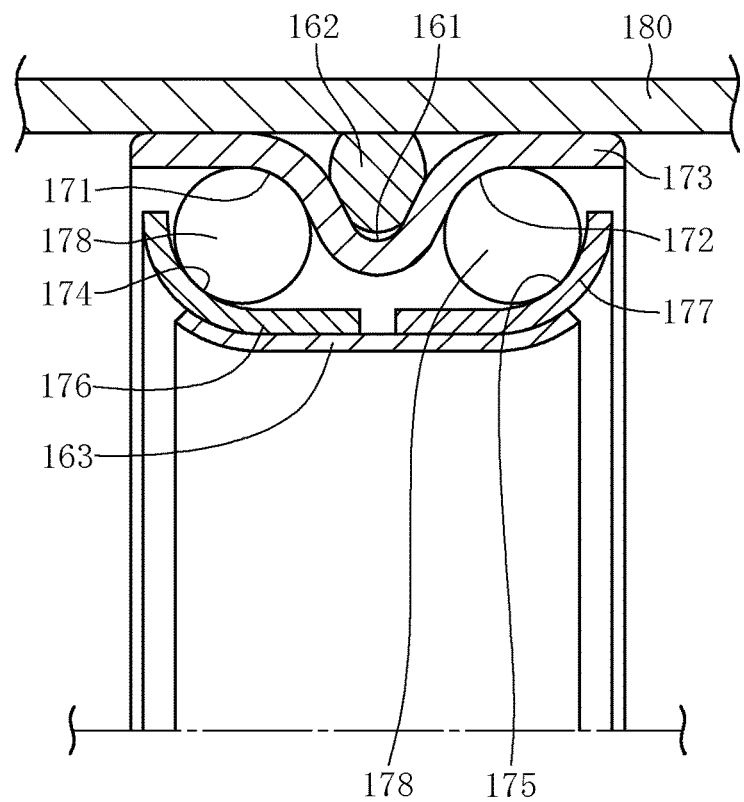
FIG. 26 A vertical sectional view of anther conventional bearing.
Figure 27:
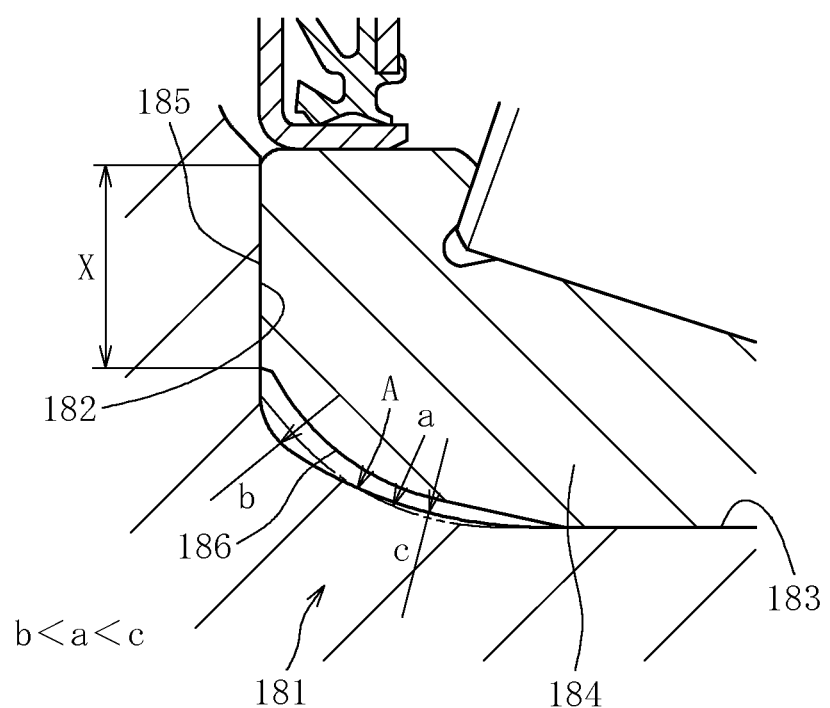
FIG. 27 A vertical sectional view of still anther conventional bearing.

Incidentally, the inner races 24 illustrated in FIG. 1 is formed so that larger-diameter-side thickness of the outboard-side inner race 24A is smaller than that of conventional inner races illustrated in FIG. 21. Further, in the wheel bearing device illustrated in FIG. 10, as illustrated in FIG. 11, at a position at which an action line Lc_forming a contact angle α intersects with the hub wheel 1, the inner race 24A is out of contact with the hub wheel 1, and hence clearance is secured between the inner race 24A and the hub wheel 1. In this case, as illustrated in FIG. 11, a corner portion B of the hub wheel 1 (corner portion on a flange 21 side of a smaller-diameter step portion la of the hub wheel 1) is constituted by a composite R having curvature radii Rb and Rc.

Figure 12A:
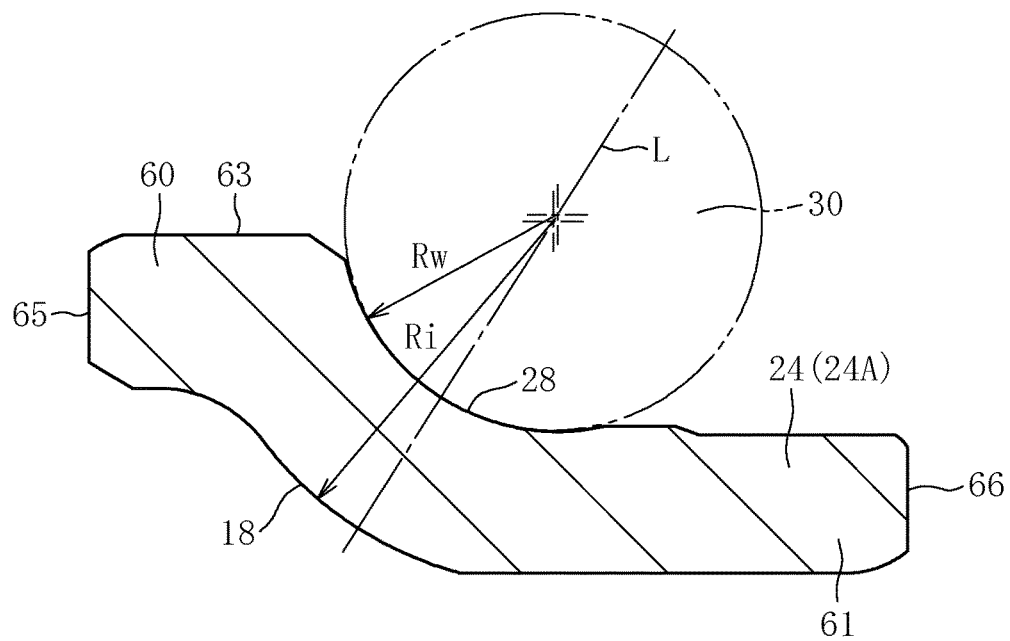
FIG. 12A An enlarged sectional view of an inner race of the wheel bearing device illustrated in FIG. 10.

As illustrated in FIG. 12A, the inner races 24 are configured so that a center position of a curvature radius Rw of the balls 30 (curvature radius of an inner rolling surface 8a) and a center position of a curvature radius Ri of an inner diameter portion 18 in the larger-diameter portion 60 are substantially the same as each other. With this setting, the thickness of the inner races 24 can be set to be substantially uniform, and a degree of freedom of setting the shape and dimensions described later of the corner portion B of the hub wheel 1 is increased. As a result, strength and rigidity of the hub wheel 1 can be enhanced.

Figure 12B:
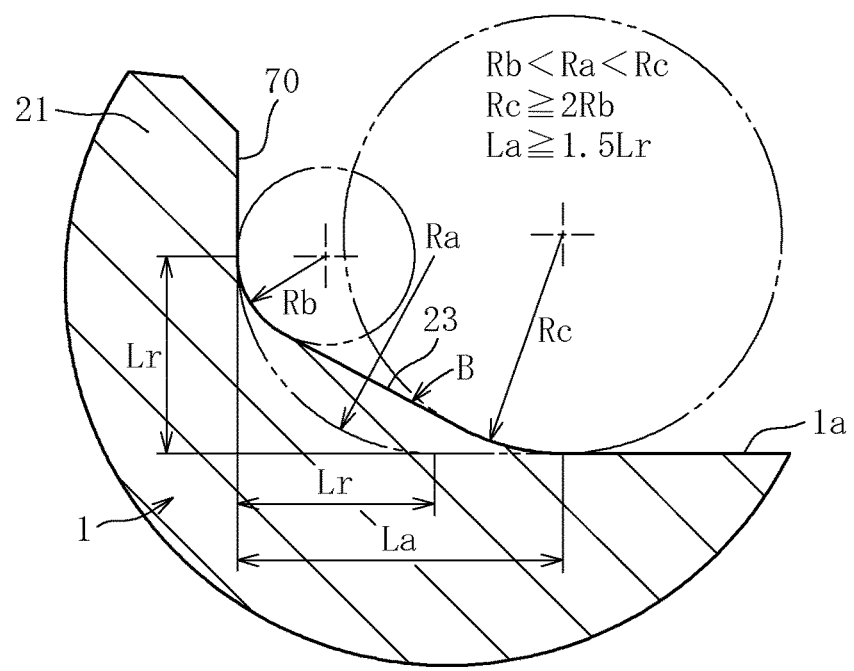
FIG. 12B An enlarged sectional view of a hub wheel of the wheel bearing device illustrated in FIG. 10.

As illustrated in FIG. 12B, the corner portion B of the hub wheel 1 is constituted by the composite R having the curvature radii Rb and Rc, the curvature radius Rb on an end surface 70 side being set to be smaller than a maximum curvature radius Ra when a corner R is a virtual arc having a constant curvature radius. Further, the curvature radius Rc on the inboard side is set to be larger than the maximum curvature radius Ra when the corner R is the virtual arc having a constant curvature radius (Rb<Ra<Rc), the curvature radius Rc being set to be twice or more as large as the curvature radius Rb (Rc≥2×Rb). As shown in FIG. 12B, the virtual arc corresponding to Ra has a first convergence point on an outer diameter end of the recessed curved surface on the end surface 70 side, and a second convergence point on an extended line of the smaller-diameter step portion la toward the end surface 70 side.

Figure 12C:
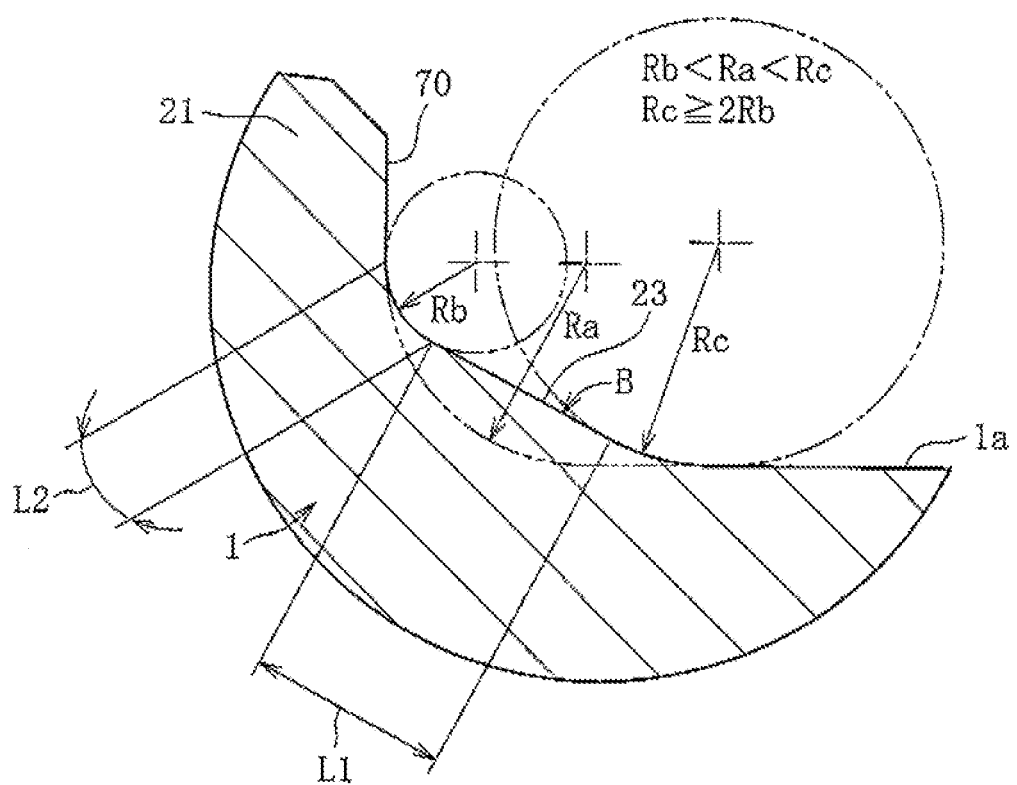
FIG. 12C The enlarged sectional view of a hub wheel of the wheel bearing device illustrated in FIG. 12B, showing additional dimensions.

In addition, the corner portion B is constituted by the composite R and a tangential line 23 smoothly connecting those curvature radii Rb and Rc, and an axial dimension La of the corner portion B is set to be 1.5 times or more as large as a radial dimension Lr thereof (La≥1.5×Lr). With this setting, even when large moment load is applied to the hub wheel 1 through intermediation of the wheel attachment flange 21 during turning of the vehicle, stress generated in the corner portion B can be suppressed. As a result, it is possible to achieve weight reduction and compactification, and to provide a wheel bearing device in which the hub wheel 1 is enhanced in strength and durability. Note that, in the wheel bearing device illustrated, for example, in FIG. 10, a stopper ring 82 is attached on an outboard side of the radially inner surface 80 of the knuckle, and the wheel bearing device is maintained in a state in which the outer race 25 is sandwiched between the stopper ring 82 and the swelling portion 81. Further, as illustrated in FIG. 12C, a length L1 of the tangential line 23 is longer than an arc-length L2 of the recessed curved surface corresponding to Rb, and a distance between the tangential line 23 and a center of the virtual arc corresponding to Ra is less than a distance between the virtual arc and the center of the virtual arc.

Figure 13:
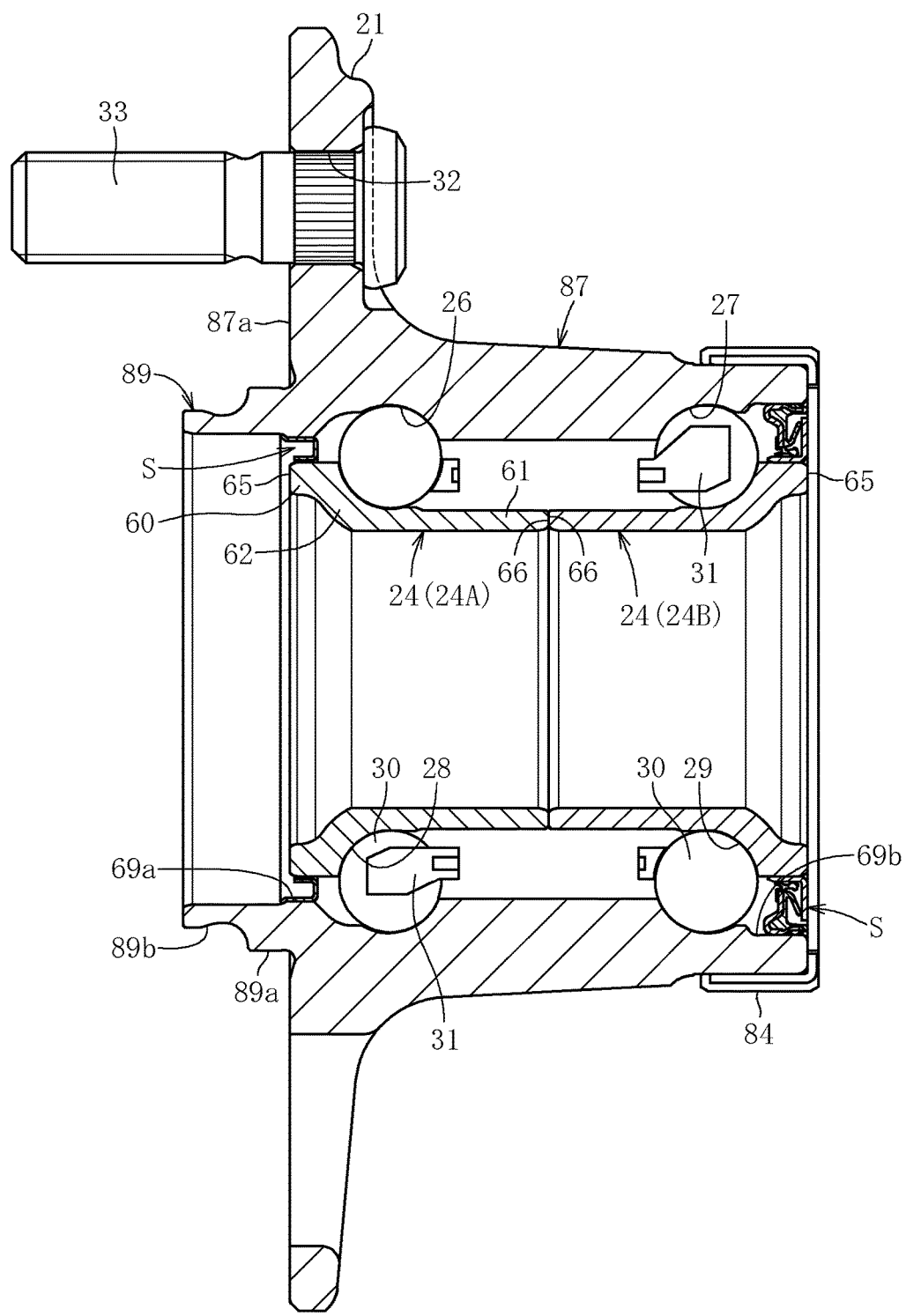
FIG. 13 A sectional view of a wheel bearing device according to a second embodiment of the present invention.

Next, FIG. 13 illustrates a double-row angular bearing according to a second embodiment of the present invention. A wheel bearing device in this case is of an outer-race rotation type. Specifically, the bearing 2 includes an outer race (outward member) 87 having the wheel attachment flange 21 on an outboard side on a radially outer surface thereof. The bolt insertion hole 32 is provided in the wheel attachment flange 21, and the hub bolt 33 is mounted into the bolt insertion hole 32. Further, outer rolling surfaces 26 and 27 are provided on a radially inner surface of the outer race 87.

In addition, a pilot portion 89 is provided in an outboard-side end surface 87a of the outer race 87. The pilot portion 89 is constituted by a larger-diameter brake pilot 89a on an outboard-side end surface 87a side, and a smaller-diameter wheel pilot 89b on a side opposite to the end surface.

The inner races 24 in this case are similar to the inner races 24 illustrated in FIG. 1. Seal mounting portions 69a and 69b are formed on both end sides of the radially inner surface of the outer race 87, and the radially outer surfaces of the larger-diameter portions 60 of the inner races 24A and 24B serve as the seal mounting portions 63. In addition, each of the radially outer surfaces of the tapered portions 62 serves as the rolling surface 28 (29). In this context, the seals S are inserted into the opening portions between the outer race 87 and the inner races 24A and 24B.

Incidentally, the wheel bearing device as illustrated in FIG. 13 is mounted to an axle for a driven wheel of a truck and the like, and rotatably supports the wheel. Thus, the inner races 24A and 24B are mounted onto the axle. Further, a magnetic encoder 84 for detecting a rotational speed of the wheel is additionally provided on an inboard-side end portion of the outer race 87.

Figure 14:
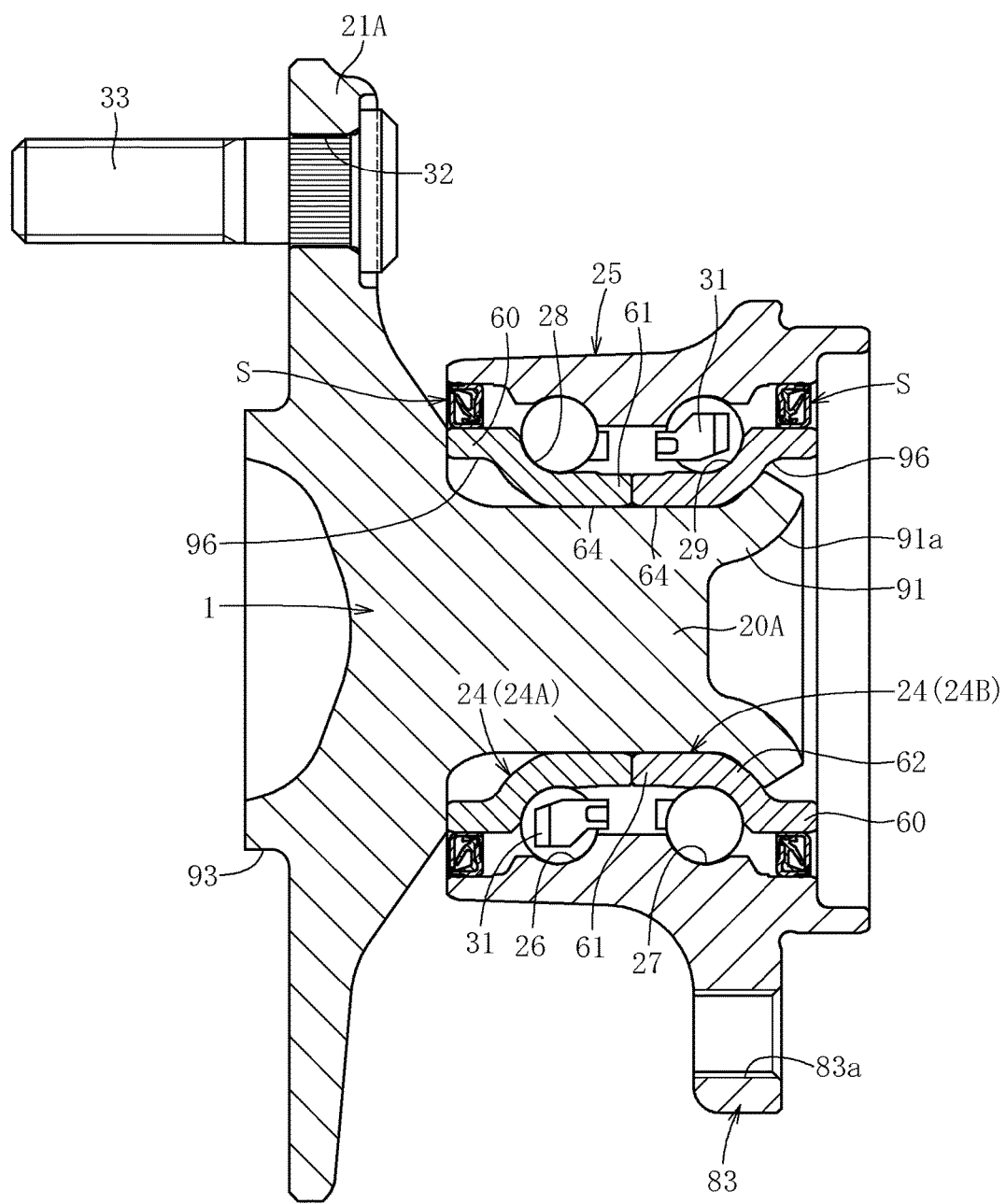
FIG. 14 A sectional view of a wheel bearing device according to a third embodiment of the present invention.

Next, FIG. 14 illustrates a double-row angular bearing according to a third embodiment of the present invention. In this case, a wheel bearing device is provided on a driven side, in which the hub wheel 1 includes a solid shaft section 20A, and a flange section 21A projected from the shaft section 20A. The bolt insertion hole 32 is provided in the flange section 21A of the hub wheel 1, and the hub bolt 33 for fixing a wheel and a brake rotor to the flange section 21A is mounted into the bolt insertion hole 32.

An inboard-side end portion of the hub wheel 1 is formed as a barrel-like portion 91, an inboard-side end portion of the barrel-like portion 91 is caulked to a radially outer side, and a caulked portion 91*a* thereof is engaged with (fitted to) the thickness-reduced portion 96 of the inner race 24B. Further, a pilot portion 93 is provided in an outboard-side end surface of the hub wheel 1.

Note that, the outer race 25 in FIG. 14 is not a cold rolling product, and includes a vehicle-body attachment flange 83 having a screw hole 83a. The inner races 24A and 24B are similar to the inner races 24 and 24 illustrated in FIG. 1.

Figure 15:
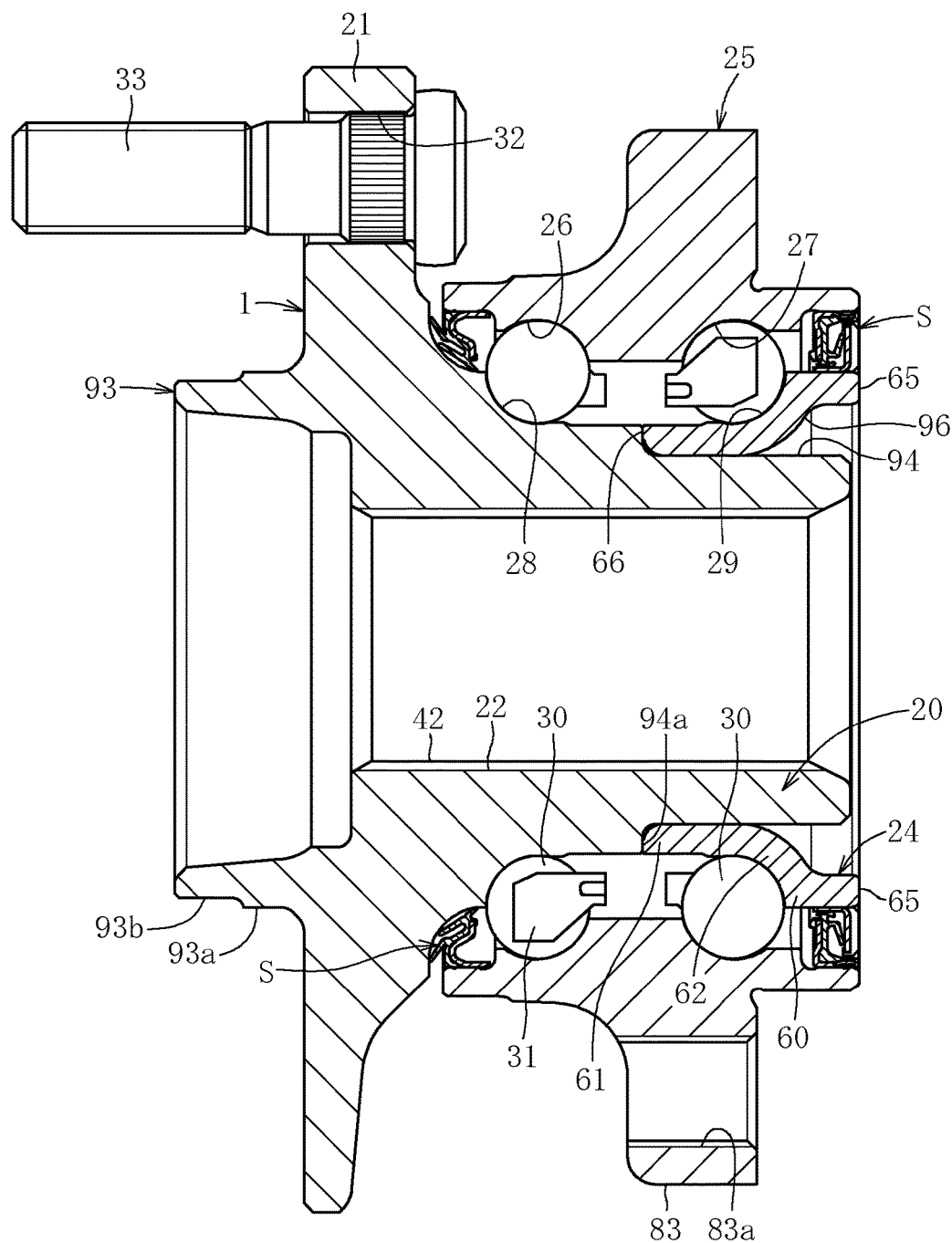
FIG. 15 A sectional view of a wheel bearing device according to a fourth embodiment of the present invention.
Figure 16:
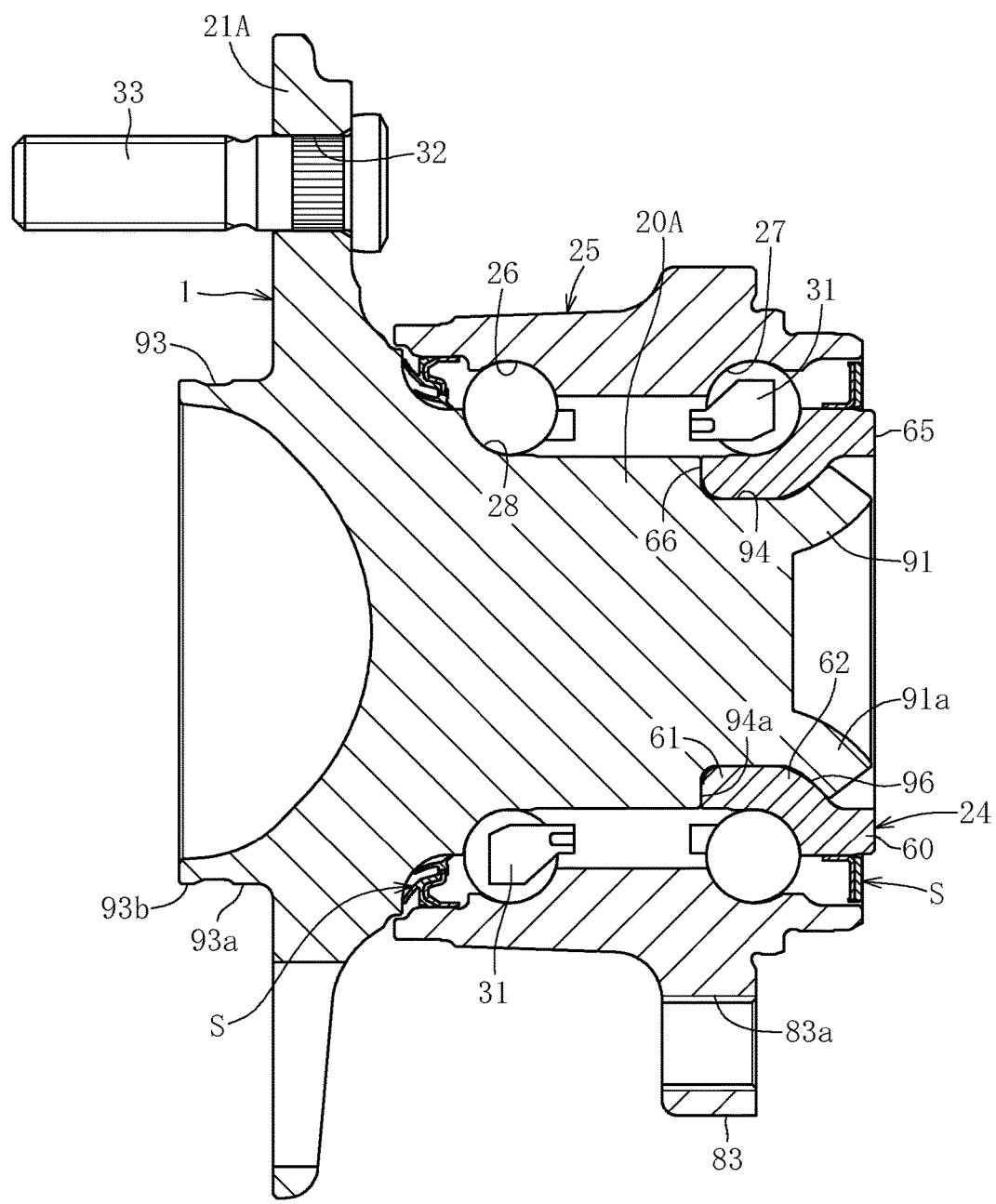
FIG. 16 A sectional view of a wheel bearing device according to a fifth embodiment of the present invention.

Next, an angular bearing of FIG. 15 according to a fourth embodiment of the present invention and an angular bearing of FIG. 16 according to a fifth embodiment of the present invention are each used for a wheel bearing device having a so-called third generation structure in which the inner rolling surface 28 of the bearing 2 is formed on the radially outer surface of the hub wheel 1. Specifically, in the wheel bearing device in FIG. 15, a smaller-diameter portion 94 is provided on an inboard-side outer peripheral surface of the shaft section (barrel section) 20 of the hub wheel 1, and the inner races 24 is fitted to the smaller-diameter portion 94. The inner rolling surface 28 is provided near a flange on an outer peripheral surface of the barrel section 20 of the hub wheel 1.

Then, the outer rolling surface 26 of the outer race 25 and the inner rolling surface 28 of the hub wheel 1 are opposed to each other, and the outer rolling surface 27 of the outer race 25 and the rolling surface 29 of the inner race 24 are opposed to each other. The rolling elements 30 are interposed between the outer rolling surface 26 and the inner rolling surface 28 and between the outer rolling surface 27 and the rolling surface 29. The inner race 24 in this case is similar to the inner race 24B illustrated in FIG. 1.

In this case, when the stem shaft 12 of the constant velocity universal joint 3 is inserted and mounted into the hole portion 22 of the hub wheel 1, the back surface 11*a* of the mouth section 11 comes into contact with the end surface 65 of the inner race 24. Therefore, the end surface 66 of the inner race 24 comes into contact with an end surface 94*a* of the smaller-diameter portion 94, whereby pre-load can be imparted to the inner race 24.

The pilot portion 93 is provided in the outboard-side end surface of the hub wheel 1. The pilot portion 93 is constituted by a larger-diameter brake pilot 93*a* on the outboard-side end surface side, and a smaller-diameter wheel pilot 93*b* on a side opposite to the end surface.

Further, in the wheel bearing device illustrated in FIG. 16, similarly to the wheel bearing device illustrated in FIG. 14, the hub wheel 1 includes the solid shaft section 20A, and the flange section 21A projected from the shaft section 20A. Then, the smaller-diameter portion 94 is formed on an inboard-side radially outer surface (outer peripheral surface) of the shaft section 20A, and the inner race 24 is fitted to the smaller-diameter portion 94. The inner race 24 in this case is similar to the inner race 24B illustrated in FIG. 1.

In a wheel bearing device illustrated in FIG. 16, similarly to the wheel bearing device illustrated in FIG. 14, the inboard-side end portion of the hub wheel 1 is formed as the barrel-like portion 91, the inboard-side end portion of the barrel-like portion 91 is caulked to the radially outer side, and such a caulked portion 91*a* is engaged with (fitted to) the thickness-reduced portion 96 of the inner race 24. Further, the pilot portion 93 is provided in an outboard-side end surface of the hub wheel 1.

In each of the wheel bearing device illustrated in FIG. 14 and FIG. 16, the radially outer portion on the inboard-side end portion of the shaft section 20A of the hub wheel 1 is caulked in the radially outer direction, and the caulked portion 91*a* thereof is engaged with the thickness-reduced portion 96 of the inner race 24, whereby the inner race 24 and the hub wheel 1 are integrated with each other. Therefore, it is possible to stably mount the bearing 2 to the hub wheel 1, and possible to exert stable torque-transmitting function for a long period.

Also in the wheel bearing devices illustrated in FIG. 14 to FIG. 16, the inner races 24 are formed by a cold rolling process, and hardness prior to the cold rolling process of the blank 34 is set to Rockwell Hardness 30 HRC or less. Thus, it is possible to enhance the yield and productivity of the inner races 24 and to achieve cost reduction. In addition, the inner races 24 can be endowed with stable processing accuracy and high strength, whereby it is possible to enhance quality of the bearing. Further, it is also possible to achieve weight reduction of the inner races 24, to thereby achieve fuel consumption reduction. In particular, the hardness of the blank 34 is set to Rockwell Hardness 30 HRC or less, whereby it is possible to enhance processing accuracy and to form the inner races 24 of high quality.

Figure 17:
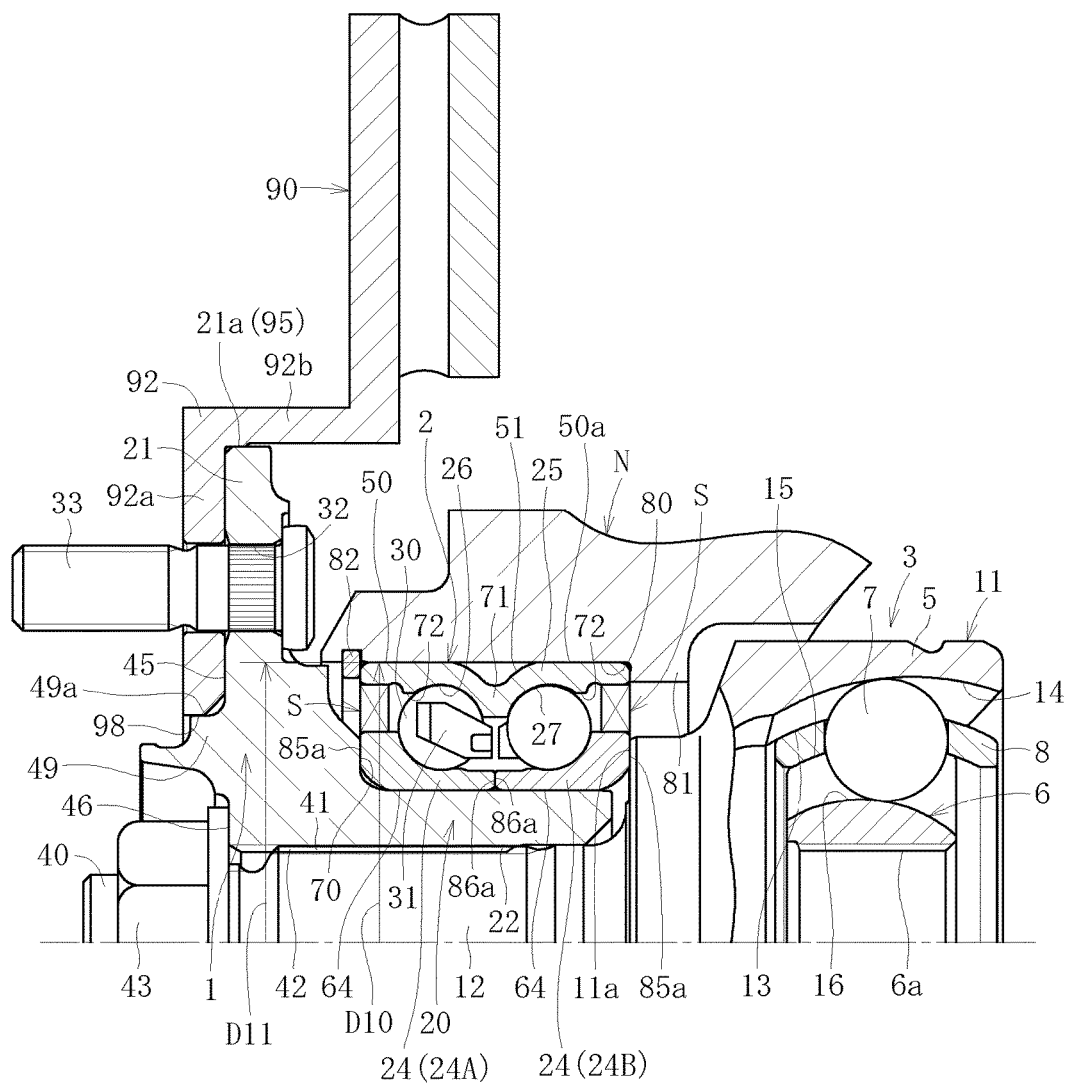
FIG. 17 A sectional view of a wheel bearing device according to a sixth embodiment of the present invention.
Figure 18:
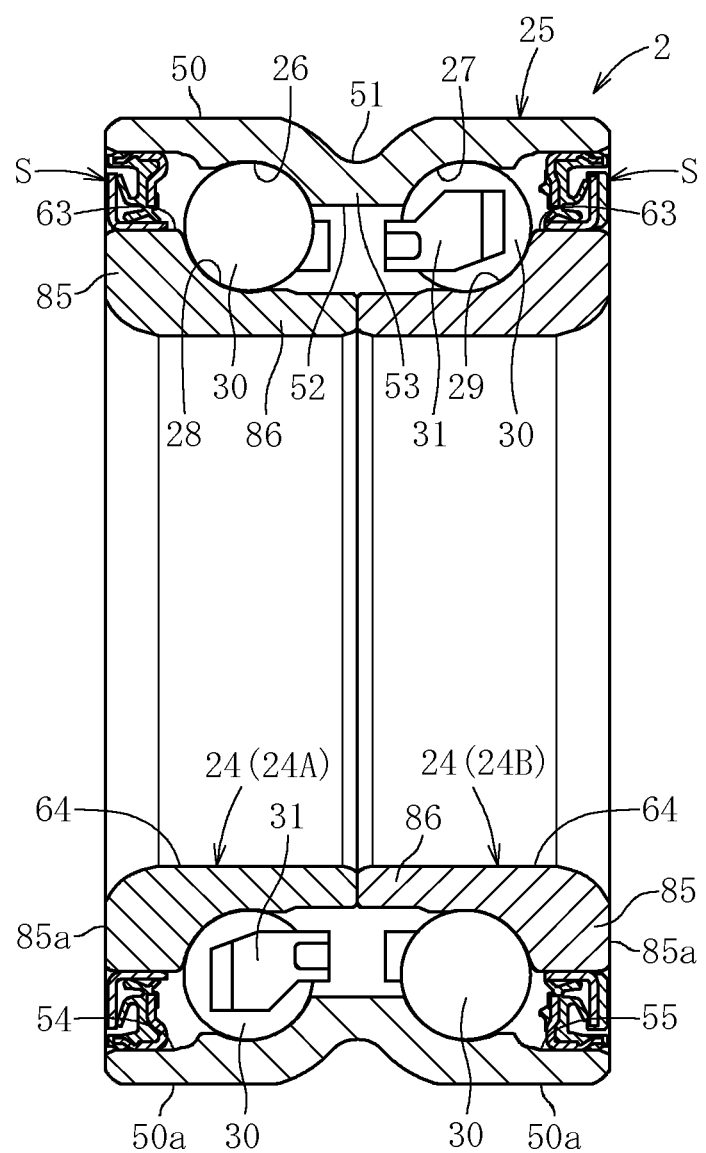
FIG. 18 A sectional view of a double-row angular bearing of the wheel bearing device illustrated in FIG. 17.

In a wheel bearing device according to a sixth embodiment of the present invention illustrated in FIG. 17, the outer race 25 is formed by performing a cold rolling processing on the blank 34 having the circumferentially protruding portions 35 and 36 which are formed on the radially inner surface 34*b* thereof and protrude to the radially inner side. Further, similarly to those illustrated in the conventional wheel bearing device illustrated in FIG. 21 and as illustrated in FIG. 18, each of the inner races 24 (24A and 24B) is constituted by a short cylindrical body having a thick portion 85 and a thin portion 86, in which the inner rolling surface 28 (29) is formed on an outer diameter surface between the thick portion 85 and the thin portion 86. A radially outer surface of the thick portion 85 serves as the seal mounting portion 63, and a radially inner surface thereof serves as the hub-wheel fitting surface 64. That is, the inner races 24 (24A and 24B) are not formed by cold rolling.

Although the bearing 2 is press-fitted into the knuckle N also in the wheel bearing device as illustrated in FIG. 17, the stopper ring 82 is attached on the outboard side of the radially inner surface 80 of the knuckle N, and the wheel bearing device is maintained in the state in which the outer race 25 is sandwiched between the stopper ring 82 and the swelling portion 81. Also in this case, the dimension D11 of the fitting surface 50*a* of the outer race 25 of the double-row angular bearing (roller bearing) 2 is set to be slightly larger than the inner diameter dimension D10 of the radially inner surface 80 of the knuckle N, the fitting surface 50a being fitted to the knuckle N.

Further, the barrel section 20 of the hub wheel 1 is press-fitted onto the fitting surfaces 64 and 64 of the inner races 24A and 24B of the bearing 2, whereby an end surface 85a of the inner race 24A comes into contact with the cutout-portion end surface 70 of the hub wheel 1. Then, under the state in which the outer race 5 of the constant velocity universal joint 3 are coupled to the hub wheel 1, the back surface 11a of the mouth section 11 comes into contact with the end surface 85a of the inner race 24B on the inboard side. In this case, a seat surface of the nut member 43 comes into contact with a recessed surface 46 of the outboard-side end surface 45 of the hub wheel 1.

Therefore, under a state in which the end surfaces (hitting surfaces) 86a and 86a of the pair of inner races 24A and 24B are hit against each other, the pair of inner races 24A and 24B are sandwiched between the cutout-portion end surface 70 and the back surface 11a of the mouth section 11. In this state, pre-load can be imparted to the inner races 24A and 24B.

In this case, a radially outer portion 49a of a cylindrical section 49 protruding from the outboard-side end surface 45 of the hub wheel 1 serves as a brake pilot portion which guides a radially inner surface of the axial center hole 98 of the brake rotor 90.

Figure 19:
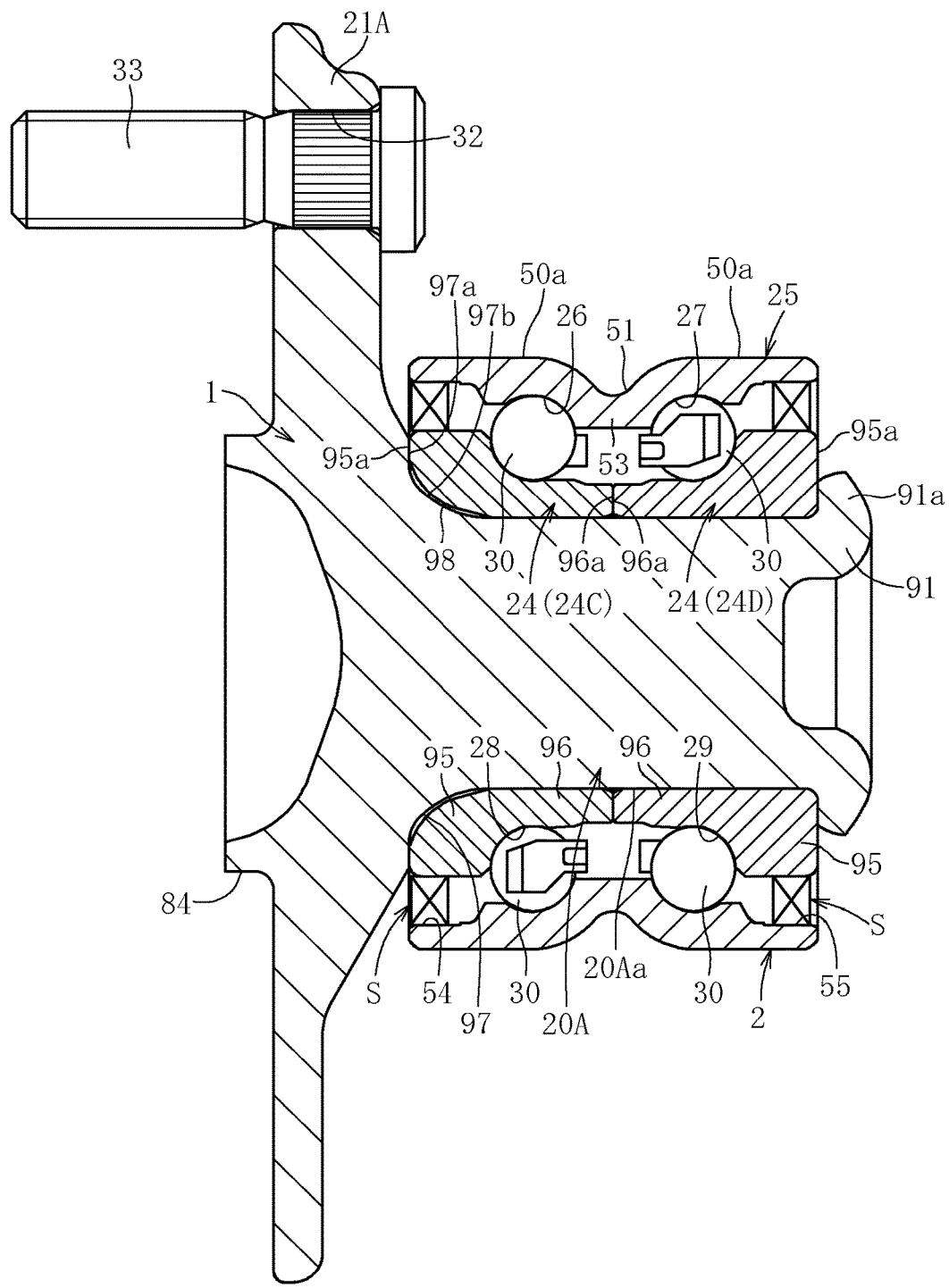
FIG. 19 A sectional view of a wheel bearing device according to a seventh embodiment of the present invention.

In a wheel bearing device in FIG. 19, only the outer race 25 is a cold rolling product, which is similar to the outer race 25 illustrated in FIG. 1. In this case, inner races 24 (24C and 24D) are not formed by cold rolling, which are similar to conventional ones illustrated in FIG. 21.

The wheel bearing device according to a seventh embodiment of the present invention illustrated in FIG. 19 is provided on a driven side, in which the hub wheel 1 includes: the solid shaft section 20A; and the flange section 21A projected from the shaft section 20A. Further, each of the inner races 24C and 24D is constituted by a short cylindrical body having a thick portion 95 and a thin portion 96, in which the rolling surface 28 (29) is formed on a radially outer surface between the thick portion 95 and the thin portion 96. Then, under a state in which end surfaces (hitting end surfaces) 96a and 96a of the respective thin portions 96 are hit against each other, the roller bearing 2 is press-fitted onto a radially outer surface 20Aa of the shaft section 20A of the hub wheel 1.

In this case, between the flange section 21A and the shaft section 20A, there is provided a boss portion 97 in which an end surface 97a extending in a direction orthogonal to the axial direction and a recessed curved surface 97b are formed. Therefore, a radially inner surface of the thick portion 95 of the outboard-side inner race 24C serves as a protruding curved surface 98 corresponding to the recessed curved surface 97b. In contrast, such a protruding curved surface is not formed on a radially inner surface of the inboard-side inner race 24D.

An inboard-side end portion of the hub wheel 1 is formed into the barrel-like portion 91, and an inboard-side end portion of the barrel-like portion 91 is caulked to a radially outer side. At a caulked portion 91a thereof, pre-load is imparted to the inner races 24 through intermediation of an end surface 95a of the inner race 24D on the inboard side. Further, a pilot portion 84 is provided on an outboard-side end surface of the hub wheel 1.

In the double-row angular bearings illustrated in FIG. 17 to FIG. 19, only the outer race 25 is a cold rolling product, and hence the inner race cannot be endowed with functions and advantages of a cold rolling product. However, the outer race 25 can be endowed with functions and advantages of a cold rolling product.

Figure 20:
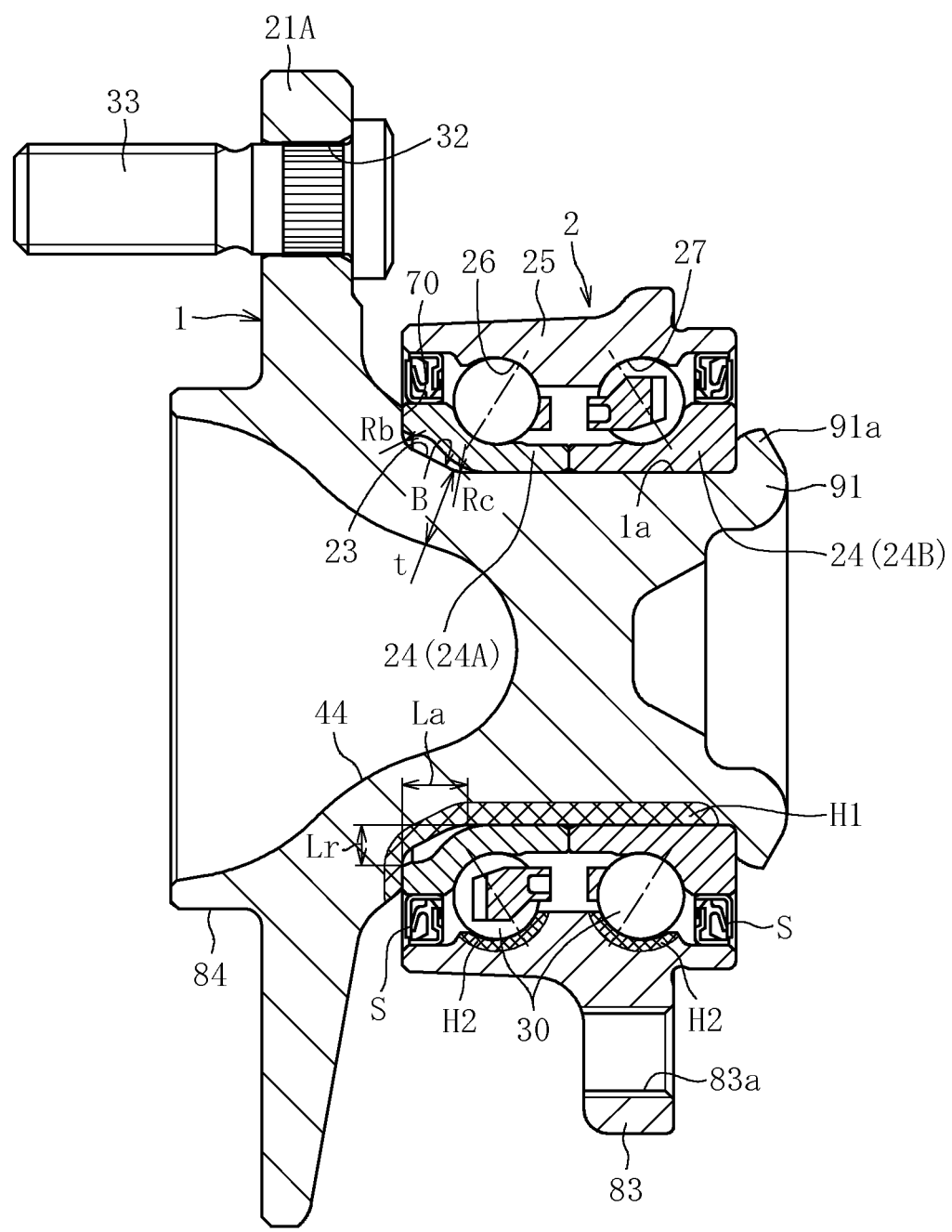
FIG. 20 A sectional view of a wheel bearing device according to an eighth embodiment of the present invention.

A wheel bearing device according to an eighth embodiment of the present invention illustrated in FIG. 20 has a second-generation structure on a driven side, and includes the hub wheel 1 and the wheel bearing 2 mounted to the hub wheel 1. The hub wheel 1 has a wheel attachment flange 21A at the end portion on the outboard side, and the smaller-diameter step portion 1a formed on an outer periphery thereof and extending in the axial direction via the shoulder portion (cutout end surface) 70 from the wheel attachment flange 21A. The wheel bearing 2 is press-fitted onto the smaller-diameter step portion 1a with a predetermined tightening margin, to thereby be fixed in the axial direction under a state of being imparted with bearing pre-load by the caulked portion 91a formed by plastic deformation of an end portion of the smaller-diameter step portion 1a. The hub wheel 1 is formed of medium-and-high-carbon steel such as S53C which includes 0.40 to 0.80 weight % of carbon. In the hub wheel 1, a hardened layer H1 is formed from the shoulder portion 70 to the smaller-diameter step portion 1a by high-frequency quenching in which surface hardness is set in a range of from 50 to 64 HRC (indicated by cross-hatching in the lower half portion in FIG. 20). Note that, composition and hardness of the caulked portion 91a remain unchanged after a forging process.

The wheel bearing 2 integrally has the vehicle-body attachment flange 83 provided on an outer periphery thereof so as to be mounted to a knuckle (not shown), and is formed of medium-and-high-carbon steel such as S53C which includes 0.40 to 0.80 weight % of carbon. In the wheel bearing 2, a hardened layer H2 is formed over the double-row outer rolling surfaces 26 and 27 by high-frequency quenching in which surface hardness is set in a range of from 54 to 64 HRC (indicated by cross-hatching in the lower half portion in FIG. 20). Meanwhile, the inner races 24A and 24B are formed of high-carbon chrome bearing steel such as SUJ2 and are subjected to hardening treatment to core portions thereof by immersion quenching so that surface hardness thereof is set in a range of from 54 to 64 HRC.

In this case, the outboard-side inner race 24A is formed by cold rolling similarly to the inner race 24A of the bearing 2 illustrated in FIG. 1, and the inboard-side inner race 24B is not formed by cold rolling similarly to the inner race 24B of the bearing 2 illustrated in FIG. 18.

Figure 10:
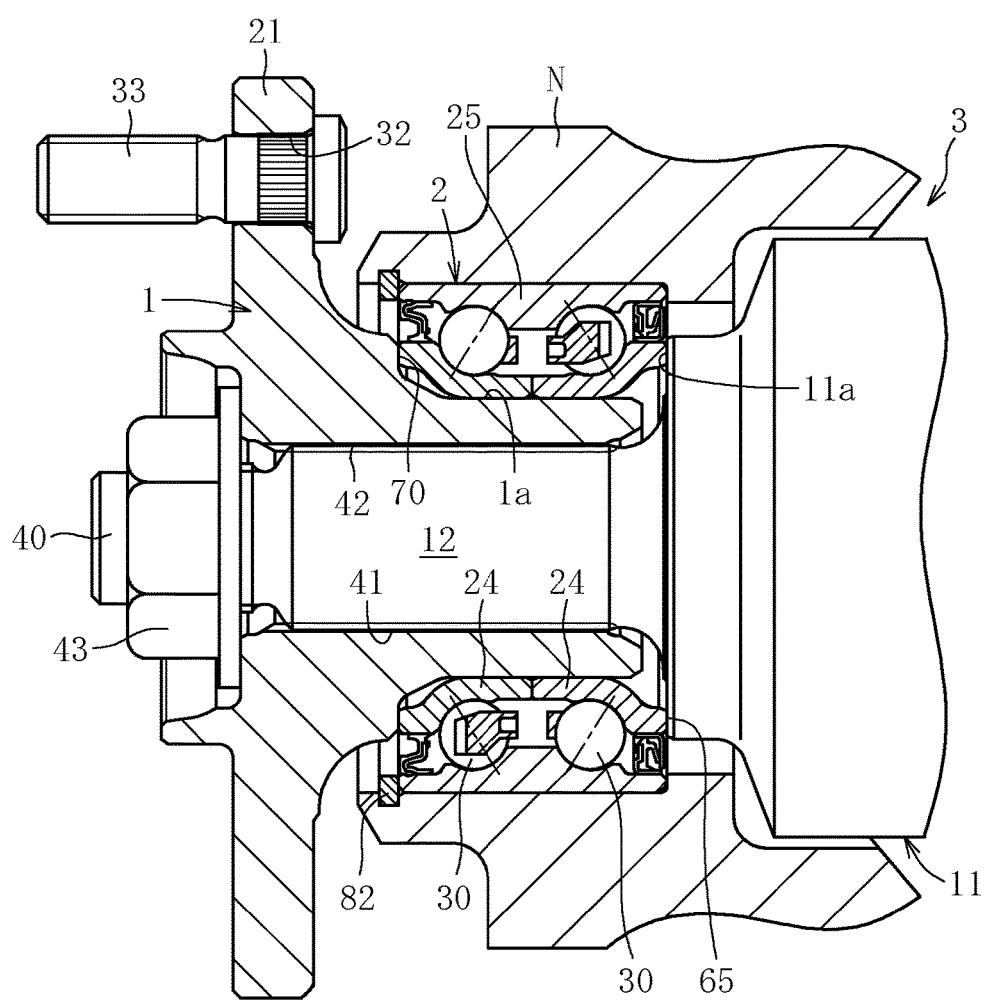
FIG. 10 A sectional view of a modification of the wheel bearing device illustrated in FIG. 1.
Figure 11:
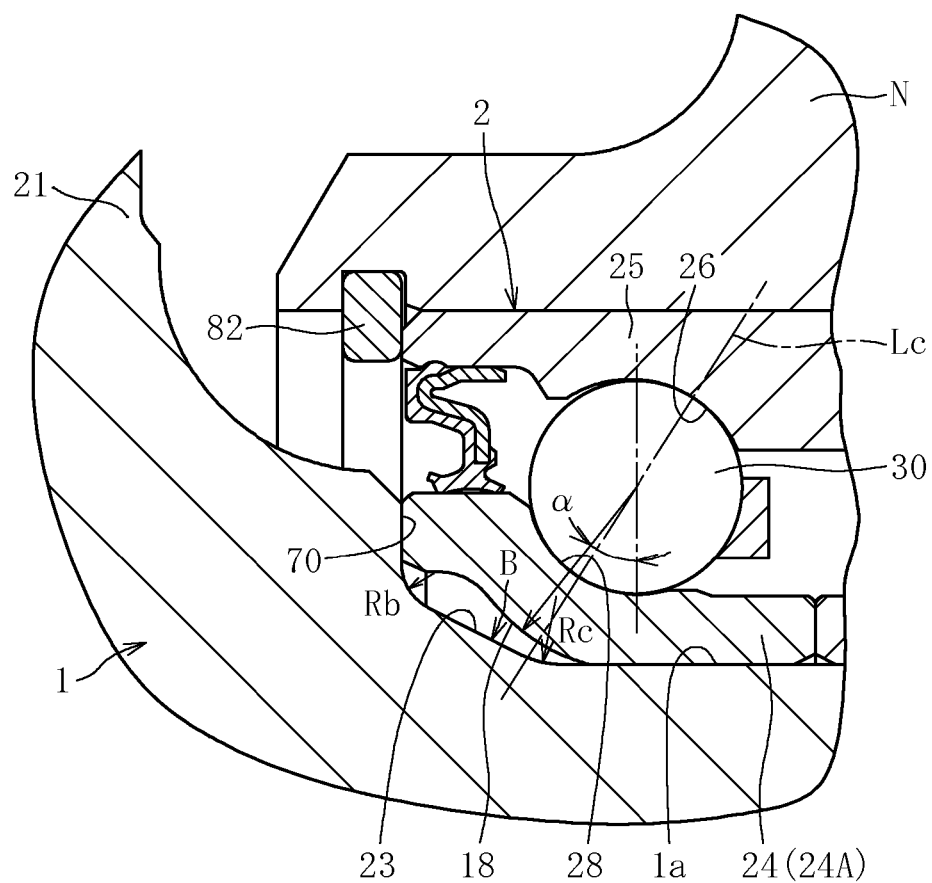
FIG. 11 An enlarged view of a main part of the wheel bearing device illustrated in FIG. 10.

Similarly to the wheel bearing devices illustrated in FIG. 10 to FIG. 12, the corner portion B of the hub wheel 1 (corner portion of the smaller-diameter step portion 1b) is constituted by the composite R having the curvature radii Rb and Rc, the curvature radius Rc on the smaller-diameter step portion 1b side being larger than the curvature radius Rb on the shoulder portion 1a side, specifically, set to be twice or more as large as the curvature radius Rb (Rc≥2×Rb). In addition, the corner portion B is constituted by the composite R and a tangential line 23 smoothly connecting those curvature radii Rb and Rc, and the axial dimension La of the corner portion B is set to be 1.5 times or more as large as a radial dimension Lr thereof (La≥1.5×Lr). With this setting, even when large moment load is applied to the hub wheel 1 during turning of the vehicle, stress generated in the corner portion B can be suppressed. As a result, it is possible to achieve weight reduction and compactification, and to enhance strength and durability of the hub wheel 1.

Note that, in an end portion on the outboard side of the hub wheel 1, there is formed a mortar-like recessed part 44 extending in the axial direction. The recessed part 44 is formed by a forging process so as to have a depth reaching at least near the balls 30 on the outboard side, and formed so that thickness on the outboard side of the hub wheel 1 is substantially uniform.

As described above in this embodiment, the larger-end portion of the inner race 24A on the outboard side is formed to be thinner than conventional inner races. In addition, clearance is secured between the inner race 24A and the hub wheel 1 at the position at which the action line Lc forming the contact angle a intersects with the hub wheel 1, and the mortar-like recessed part 44 is formed in the end portion on the outboard side of the hub wheel 1. Thus, it is possible to cause the thickness on the outboard side of the hub wheel 1 to be uniform, and to increase minimum thickness t thereof in comparison with that of the hub wheel in which a corner R is a single R. Therefore, even when large moment load is applied to the hub wheel 1, stress generated in the corner portion B can be suppressed. As a result, it is possible to achieve weight reduction and compactification, and to enhance strength and durability of the hub wheel 1.

Hereinabove, although the embodiments of the present invention are described, the present invention is not limited to the above-mentioned embodiments, and various modifications may be made. For example, although the blank 34 for forming the outer race 25 is formed of the pipe material in the above-mentioned embodiments, there may be used one obtained in the following manner: a round-bar steel material is cut into a predetermined dimension; a piece cut out therefrom is roughly formed into a ring shape by hot forging or the like; and then the piece is subjected to a latching process and finished. Further, in the above-mentioned embodiments, the rolling elements as torque transmission members for the bearing 2 are constituted by the balls 30. Alternatively, tapered rollers may be used as the rolling elements.

INDUSTRIAL APPLICABILITY

The wheel bearing device according to the present invention may be used for a driving wheel or for a driven wheel, and is capable of effectively exerting the functions thereof. Further, the wheel bearing device according to the present invention is applicable to ones having the following structures: a first-generation structure in which double-row roller bearings are independently used; a second-generation structure in which a vehicle-body attachment flange or a wheel attachment flange is integrally provided onto an outer member; a third-generation structure in which an inner rolling surface of one of the double-row roller bearings is formed integrally with an outer periphery of a hub wheel integrally having a wheel attachment flange; and a fourth-generation structure in which a constant velocity universal joint is integrated with the hub wheel and an inner rolling surface of another of the double-row roller bearings is also formed integrally with an outer periphery of an outer joint member constituting the constant velocity universal joint.

The invention claimed is:

1. A wheel bearing device comprising:
a hub wheel comprising:
a wheel attachment flange integrally provided at one end portion of the hub wheel; and
a smaller-diameter step portion extending in an axial direction from the wheel attachment flange via a shoulder portion, and
a wheel bearing press-fitted onto the smaller-diameter step portion of the hub wheel with a predetermined tightening margin, the wheel bearing comprising:
an outer member including double-row arcuate outer rolling surfaces formed integrally on an inner periphery of the outer member;
a pair of inner races, each of the inner races including an arcuate inner rolling surface opposed to the double-row outer rolling surfaces, and the arcuate inner rolling surfaces being disposed on an outer periphery of the respective inner race;
double-row balls housed between both the rolling surfaces of the inner races and the outer member; and
seals mounted into opening portions of an annular space formed between the outer member and the inner race, the pair of inner races having smaller-end surfaces which abut against each other to constitute a double-row angular bearing,
wherein:
the pair of inner races comprise at least one inner race on an outboard side, the at least one inner race being provided with an extended portion extending in an axial direction from a larger-diameter side of the inner rolling surface of the at least one inner race;
the at least one inner race has a uniform thickness entirely along the axial direction of the hub wheel;
a corner portion formed by a shoulder portion of the hub wheel and the smaller-diameter step portion of the hub wheel is constituted by a composite recessed curved surface including a recessed curved surface on a shoulder portion side, a recessed curved surface on a smaller-diameter step portion side, and a tangential line connecting the recessed curved surfaces, and the tangential line constitutes a tapered surface that is gradually reduced in diameter from the recessed curved surface on the shoulder portion side toward the recessed curved surface on the smaller-diameter step portion side;
a clearance is formed between the at least one inner race and the hub wheel such that the at least one inner race is out of contact with the hub wheel at a position where an action line intersects with the hub wheel, the action line being a contact angle of the balls on the outboard side with the at least one inner race, with a large-diameter side radially inner surface of the at least one inner race being formed as a curved surface on an opposite side of the at least one inner race from the inner rolling surface of the at least one inner race;
Rb <Ra <Rc, where Ra is a maximum curvature radius of a virtual arc having a first convergence point on an outer diameter end of the recessed curved surface on the shoulder portion side of the hub wheel, and a second convergence point on an extended line of the smaller-diameter step portion of the hub wheel toward the shoulder portion side, the curvature radius of the virtual arc being constant, Rb is a curvature radius of the recessed curved surface on the shoulder portion side, and Rc is a curvature radius of the recessed curved surface on the smaller-diameter step portion side;
the curvature radius Rc is twice or more as large as the curvature radius Rb;
a length of the tangential line is longer than an arc-length of the recessed curved surface on the shoulder portion side, and an axial dimension La of the corner portion of the hub wheel is 1.5 times or more as large as a radial dimension Lr of the corner portion of the hub wheel; and a distance between the tangential line and a center of the virtual arc is less than a distance between the virtual arc and the center of the virtual arc.

2. The wheel bearing device of claim 1, wherein the at least one inner race on the outboard side is formed of a pipe material by a cold rolling process.

3. The wheel bearing device of claim 1,
wherein a cone-shaped recessed part formed by a forging process in an end portion on an outboard side of the hub wheel is provided such that a thickness of the hub wheel at the corner portion is uniform.

4. The wheel bearing device according to claim 1, wherein the at least one inner race has an inner diameter section on a radially inner surface, the inner diameter section having a curvature radius, and
wherein the at least one inner race is configured such that a center position of the curvature radius of the inner diameter section is substantially the same as a center position of a curvature radius of the balls on the outboard side.

* * * * *